(12) United States Patent
Yum et al.

(10) Patent No.: US 11,374,798 B2
(45) Date of Patent: Jun. 28, 2022

(54) METHOD FOR TRANSMITTING AND RECEIVING SOUNDING REFERENCE SIGNAL IN WIRELESS COMMUNICATION SYSTEM, AND APPARATUS THEREFOR

(71) Applicant: LG Electronics Inc., Seoul (KR)

(72) Inventors: Kunil Yum, Seoul (KR); Jiwon Kang, Seoul (KR); Kijun Kim, Seoul (KR); Jonghyun Park, Seoul (KR); Kukheon Choi, Seoul (KR)

(73) Assignee: LG Electronics Inc., Seoul (KR)

( * ) Notice: Subject to any disclaimer, the term of this patent is extended or adjusted under 35 U.S.C. 154(b) by 49 days.

(21) Appl. No.: 16/959,962

(22) PCT Filed: Jan. 7, 2019

(86) PCT No.: PCT/KR2019/000210
§ 371 (c)(1),
(2) Date: Jul. 2, 2020

(87) PCT Pub. No.: WO2019/135651
PCT Pub. Date: Jul. 11, 2019

(65) Prior Publication Data
US 2021/0075646 A1 Mar. 11, 2021

Related U.S. Application Data

(60) Provisional application No. 62/619,120, filed on Jan. 19, 2018, provisional application No. 62/613,771, filed on Jan. 5, 2018.

(51) Int. Cl.
*H04W 72/04* (2009.01)
*H04L 25/02* (2006.01)
(Continued)

(52) U.S. Cl.
CPC ....... *H04L 25/0226* (2013.01); *H04B 1/7143* (2013.01); *H04L 5/0051* (2013.01);
(Continued)

(58) Field of Classification Search
CPC ......... H04W 72/0453; H04W 72/0446; H04W 72/042; H04B 1/7143; H04L 25/0226; H04L 5/0051
See application file for complete search history.

(56) References Cited

U.S. PATENT DOCUMENTS

2010/0067410 A1* 3/2010 He .................. H04L 5/0007
370/280
2013/0194908 A1 8/2013 Gao et al.
(Continued)

FOREIGN PATENT DOCUMENTS

KR 10-2016-0087370 7/2016

OTHER PUBLICATIONS

Samsung, "Remaining details on SRS," R1-1717632, 3GPP TSG RAN WG1 Meeting 90bis, Prague, CZ, Oct. 9-13, 2017, 6 pages.
(Continued)

*Primary Examiner* — Wei Zhao
(74) *Attorney, Agent, or Firm* — Fish & Richardson P.C.

(57) ABSTRACT

Disclosed are a method for transmitting and receiving a sounding reference signal (SRS) in a wireless communication system, and an apparatus therefor. Specifically, a method for a terminal to transmit an SRS in a wireless communication system comprises: a step of receiving, from a base station, SRS configuration information, wherein the SRS configuration information includes SRS bandwidth configuration information related to an SRS hopping pattern; and a step of determining, on the basis of the SRS bandwidth configuration information, a first parameter indicating the entire bandwidth allocated to the SRS, a second parameter
(Continued)

indicating a bandwidth for hopping units of the SRS, and a third parameter indicating the number of hopping units of the SRS, and transmitting the SRS to the base station by applying the SRS hopping pattern configured on the basis of the first parameter, the second parameter, and the third parameter, wherein the value of the third parameter may be configured in association with the number of symbols constituting the SRS hopping pattern.

15 Claims, 12 Drawing Sheets

(51) Int. Cl.
*H04B 1/7143* (2011.01)
*H04L 5/00* (2006.01)
(52) U.S. Cl.
CPC ..... *H04W 72/042* (2013.01); *H04W 72/0446* (2013.01); *H04W 72/0453* (2013.01)

(56) References Cited

U.S. PATENT DOCUMENTS

2013/0294318 A1* 11/2013 Amerga ................. H04W 4/06
370/312
2020/0213161 A1* 7/2020 Zhang ................ H04L 25/0226

OTHER PUBLICATIONS

Qualcomm Incorporated, "Remaining details on SRS," R1-1718549, 3GPP TSG RAN WG1 Meeting 90bis, Prague, CZ, Oct. 9-13, 2017, 9 pages.
Ericsson, "Discussion on SRS frequency hopping in NR," R1-1720984, 3GPP TSG RAN WG1 Meeting 91, Reno, USA, Nov. 27-Dec. 1, 2017, 6 pages.
International Search Report in International Application No. PCT/KR2019/000210, dated Apr. 22, 2019, 5 pages (with English translation).

* cited by examiner

| RB\time | 0 | 1 | 2 | 3 | 4 |
|---|---|---|---|---|---|
| 0 | ▨ | | | | |
| 1 | ▨ | | | | |
| 2 | ▨ | | | | |
| 3 | ▨ | | | | |
| 4 | | | | ▨ | |
| 5 | | | | ▨ | |
| 6 | | | | ▨ | |
| 7 | | | | ▨ | |
| 8 | | ▨ | | | |
| 9 | | ▨ | | | |
| 10 | | ▨ | | | |
| 11 | | ▨ | | | |
| 12 | | | | | ▨ |
| 13 | | | | | ▨ |
| 14 | | | | | ▨ |
| 15 | | | | | ▨ |
| 16 | | | ▨ | | |
| 17 | | | ▨ | | |
| 18 | | | ▨ | | |
| 19 | | | ▨ | | |

4symbols − SRS can be configured in a slot $5^{th}$ symbol − SRS cannot be configured in a slot

METHOD FOR TRANSMITTING AND RECEIVING SOUNDING REFERENCE SIGNAL IN WIRELESS COMMUNICATION SYSTEM, AND APPARATUS THEREFOR

CROSS-REFERENCE TO RELATED APPLICATION

This application is the National Stage filing under 35 U.S.C. 371 of International Application No. PCT/KR2019/000210, filed on Jan. 7, 2019, which claims the benefit of U.S. Provisional Application No. 62/613,771, filed on Jan. 5, 2018, and U.S. Provisional Application No. 62/619,120, filed on Jan. 19, 2018, the contents of which are all hereby incorporated by reference herein in their entirety.

TECHNICAL FIELD

The disclosure relates to a wireless communication system, and more specifically, to a method for communicating a sounding reference signal and a device for supporting the same.

BACKGROUND ART

Mobile communication systems have been developed to guarantee user activity while providing voice services. Mobile communication systems are expanding their services from voice only to data. Current soaring data traffic is depleting resources and users' demand for higher-data rate services is leading to the need for more advanced mobile communication systems.

Next-generation mobile communication systems are required to meet, e.g., handling of explosively increasing data traffic, significant increase in per-user transmission rate, working with a great number of connecting devices, and support for very low end-to-end latency and high-energy efficiency. To that end, various research efforts are underway for various technologies, such as dual connectivity, massive multiple input multiple output (MIMO), in-band full duplex, non-orthogonal multiple access (NOMA), super wideband support, and device networking.

DETAILED DESCRIPTION OF THE DISCLOSURE

Technical Problem

The disclosure proposes a method of transmitting/receiving a sounding reference signal (SRS) in a wireless communication system.

Specifically, the disclosure proposes a method for configuring a hopping for an SRS. In particular, the disclosure proposes a method for configuring a time/frequency hopping considering the bandwidth allocated to an SRS.

Objects of the disclosure are not limited to the foregoing, and other unmentioned objects would be apparent to one of ordinary skill in the art from the following description.

Technical Solution

According to an embodiment of the disclosure, a method of transmitting a sounding reference signal (SRS) by a user equipment (UE) in a wireless communication system comprises receiving SRS configuration information for transmission of the SRS from a base station, the SRS configuration information including SRS bandwidth configuration information related to an SRS hopping pattern, wherein a first parameter indicating a full bandwidth allocated to the SRS, a second parameter indicating a bandwidth for a hopping unit of the SRS, and a third parameter indicating a number of the hopping units of the SRS are determined based on the SRS bandwidth configuration information, and transmitting the SRS to the base station by applying the SRS hopping pattern configured based on the first parameter, the second parameter, and the third parameter, wherein a value of the third parameter may be configured in association with the number of symbols constituting the SRS hopping pattern.

Further, in the method performed by the UE according to an embodiment of the disclosure, the number of the symbols constituting the SRS hopping pattern may be determined by a number of symbols for an SRS resource allocated for the transmission of the SRS and a repetition factor related to the transmission of the SRS.

Further, the method performed by the UE according to an embodiment of the disclosure may further comprise receiving information for a plurality of third parameter sets for configuring the third parameter from the base station and receiving information indicating a specific third parameter set among the plurality of third parameter sets from the base station, wherein the third parameter may be included in the specific third parameter set.

Further, in the method performed by the UE according to an embodiment of the disclosure, a product of a comb value for the SRS and a length of a sequence generating the SRS may be set to a multiple of a number of resource elements constituting a resource block.

Further, in the method performed by the UE according to an embodiment of the disclosure, in a case where an nth SRS bandwidth configuration is indicated by the SRS bandwidth configuration information, and the SRS hopping pattern is not located in one slot allocated for the transmission of the SRS, the UE may be configured to transmit the SRS based on an n−1th SRS bandwidth configuration.

Further, in the method performed by the UE according to an embodiment of the disclosure, a slot offset related to a counting of SRS transmission may be determined according to a transmission timing of the SRS.

Further, in the method performed by the UE according to an embodiment of the disclosure, a slot offset related to a counting of the SRS transmission may be determined according to the number of times of the transmission of the SRS.

Further, in the method performed by the UE according to an embodiment of the disclosure, a number of times of the transmission of the SRS may be a number of aperiodic SRSs transmitted in a predefined specific period.

According to an embodiment of the disclosure, a UE transmitting a sounding reference signal (SRS) in a wireless communication system comprises a radio frequency (RF) unit for transmitting and receiving a radio signal and a processor functionally connected with the RF unit, wherein the processor may control to receive SRS configuration information for transmission of the SRS from a base station, the SRS configuration information including SRS bandwidth configuration information related to an SRS hopping pattern, wherein a first parameter indicating a full bandwidth allocated to the SRS, a second parameter indicating a bandwidth for a hopping unit of the SRS, and a third parameter indicating a number of the hopping unit of the SRS are determined based on the SRS bandwidth configuration information, and transmit the SRS to the base station by applying the SRS hopping pattern configured based on the first parameter, the second parameter, and the third parameter, wherein a value of the third parameter may be configured in association with a number of symbols constituting the SRS hopping pattern.

Further, in the UE according to an embodiment of the disclosure, the number of the symbols constituting the SRS hopping pattern may be determined by a number of symbols for an SRS resource allocated for the transmission of the SRS and a repetition factor related to the transmission of the SRS.

Further, in the UE according to an embodiment of the disclosure, the processor may controls to receive information for a plurality of third parameter sets for configuring the third parameter from the base station and receive information indicating a specific third parameter set among the plurality of third parameter sets from the base station, wherein the third parameter may be included in the specific third parameter set.

Further, in the UE according to an embodiment of the disclosure, a product of a comb value for the SRS and a length of a sequence generating the SRS may be set to a multiple of a number of resource elements constituting a resource block.

Further, in the UE according to an embodiment of the disclosure, in a case where an nth SRS bandwidth configuration is indicated by the SRS bandwidth configuration information, and the SRS hopping pattern is not located in one slot allocated for the transmission of the SRS, the UE may be configured to transmit the SRS based on an n−1th SRS bandwidth configuration.

According to an embodiment of the disclosure, a base station receiving a sounding reference signal (SRS) in a wireless communication system comprises a radio frequency (RF) unit for transmitting and receiving a radio signal and a processor functionally connected with the RF unit, wherein the processor may control to transmit SRS configuration information for transmission of the SRS to a UE, the SRS configuration information including SRS bandwidth configuration information related to an SRS hopping pattern, wherein a first parameter indicating a full bandwidth allocated to the SRS, a second parameter indicating a bandwidth for hopping units of the SRS, and a third parameter indicating a number of the hopping units of the SRS are determined based on the SRS bandwidth configuration information and receive, from the UE, the SRS to which the SRS hopping pattern configured based on the first parameter, the second parameter, and the third parameter is applied, wherein a value of the third parameter may be configured in association with a number of symbols constituting the SRS hopping pattern.

Further, in the base station according to an embodiment of the disclosure, the number of the symbols constituting the SRS hopping pattern may be determined by a number of symbols for an SRS resource allocated for the transmission of the SRS and a repetition factor related to the transmission of the SRS.

Advantageous Effects

According to an embodiment of the disclosure, when the UE and/or base station transmits or receives an SRS, although a hopping pattern is applied to the SRS, the SRS hopping may be completely performed within one slot and the whole SRS bandwidth.

Further, according to an embodiment of the disclosure, an SRS transmission resource may be efficiently configured, and overhead and complexity related to SRS transmission/reception by the UE and/or base station may be reduced.

Effects of the disclosure are not limited to the foregoing, and other unmentioned effects would be apparent to one of ordinary skill in the art from the following description.

BRIEF DESCRIPTION OF DRAWINGS

A more complete appreciation of the disclosure and many of the attendant aspects thereof will be readily obtained as the same becomes better understood by reference to the following detailed description when considered in connection with the accompanying drawings, wherein:

FIG. 7 illustrates an example sounding reference signal (SRS) hopping pattern that may be considered in an NR system.

FIG. 8 illustrates another example SRS hopping pattern that may be considered in an NR system.

MODE FOR CARRYING OUT THE DISCLOSURE

Figure 1:
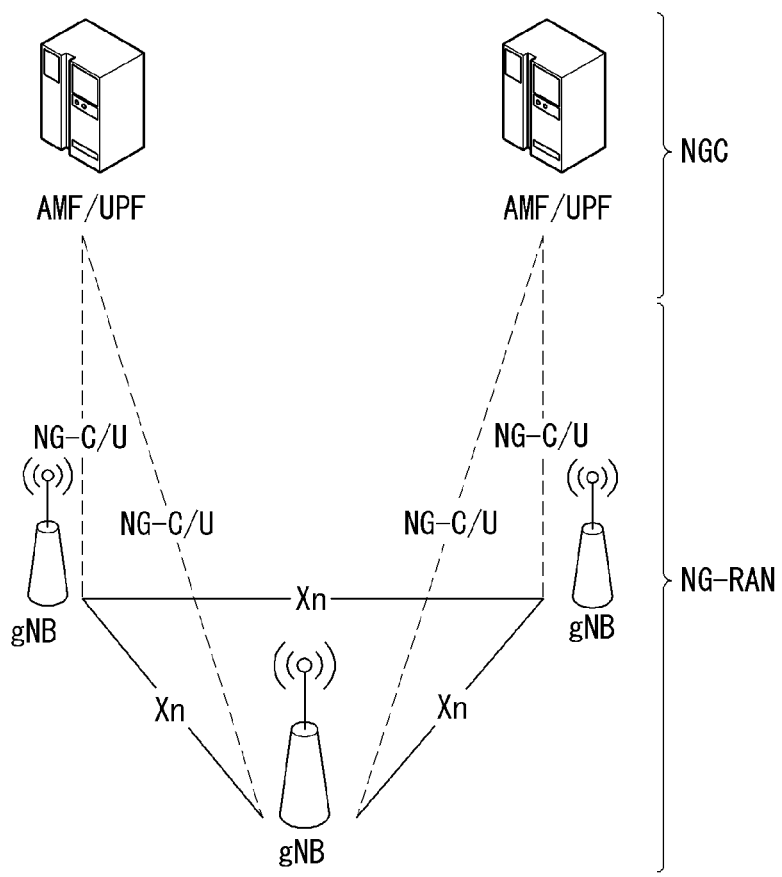
FIG. 1 is a view illustrating an example overall NR system structure to which a method as proposed in the disclosure may apply.

Hereinafter, preferred embodiments of the disclosure are described in detail with reference to the accompanying drawings. The following detailed description taken in conjunction with the accompanying drawings is intended for describing example embodiments of the disclosure, but not for representing a sole embodiment of the disclosure. The detailed description below includes specific details to convey a thorough understanding of the disclosure. However, it will be easily appreciated by one of ordinary skill in the art that embodiments of the disclosure may be practiced even without such details.

In some cases, to avoid ambiguity in concept, known structures or devices may be omitted or be shown in block diagrams while focusing on core features of each structure and device.

In the disclosure, "base station" means a network terminal node to directly communicate with a user equipment (UE). In the disclosure, a particular operation described to be performed by a base station may be performed by an upper node of the base station in some cases. In other words, in a network constituted of multiple network nodes including the base station, various operations performed to communicate with a UE may be performed by the base station or other network nodes than the base station. "Base station (BS)" may be interchangeably used with the term "fixed station," "Node B," "eNB (evolved-NodeB)," "BTS (base transceiver system)," "AP (Access Point)," or "gNB (general NB, generation NB)." "Terminal" may refer to a stationary or mobile device and may be interchangeably used with the term "UE (User Equipment)," "MS (Mobile Station)," "UT (user terminal)," "MSS (Mobile Subscriber Station)," "SS (Subscriber Station)," "AMS (Advanced Mobile Station)," "WT (Wireless terminal)," "MTC (Machine-Type Communication) device," "M2M (Machine-to-Machine) device," or "D2D (Device-to-Device) device."

Hereinafter, downlink (DL) means communication from a base station to a terminal, and uplink (UL) means communication between a terminal to a base station. For downlink, a transmitter may be part of a base station, and a receiver may be part of a terminal. For uplink, a transmitter may be part of a terminal, and a receiver may be part of a base station.

The terminology used herein is provided for a better understanding of the disclosure, and changes may be made thereto without departing from the technical spirit of the disclosure.

The following technology may be used in various radio access systems, such as code division multiple access (CDMA), frequency division multiple access (FDMA), time division multiple access (TDMA), orthogonal frequency division multiple access (OFDMA), single carrier frequency division multiple access (SC-FDMA), or non-orthogonal multiple access (NOMA). CDMA may be implemented as radio technology, such as universal terrestrial radio access (UTRA) or CDMA2000. TDMA may be implemented as GSM (global system for mobile communications)/GPRS (general packet radio service)/EDGE (enhanced data rates for GSM evolution). OFDMA may be implemented as radio technology, such as IEEE 802.11 (Wi-Fi), IEEE 802.16 (WiMAX), IEEE 802-20, or E-UTRA (evolved UTRA). UTRA is part of UMTS (universal mobile telecommunications system). 3GPP (3rd generation partnership project) LTE (long term evolution) is part of E-UMTS (evolved UMTS) using E-UTRA and adopts OFDMA for downlink and SC-FDMA for uplink. LTE-A (advanced) is an evolution of 3GPP LTE.

5G NR defines enhanced mobile broadband (eMBB), massive machine type communications (mMTC), ultra-reliable and low latency communications (URLLC), and vehicle-to-everything (V2X) depending on usage scenarios.

The 5G NR standards are divided into standalone (SA) and non-standalone (NSA) depending on co-existence between the NR system and the LTE system.

5NR supports various subcarrier spacings and supports CP-OFDM on downlink and CP-OFDM and DFT-s-OFDM (SC-OFDM) on uplink.

Embodiments of the disclosure may be supported by the standard documents disclosed in IEEE 802, 3GPP, and 3GPP2 which are radio access systems. In other words, in the embodiments of the disclosure, steps or parts skipped from description to clearly disclose the technical spirit of the disclosure may be supported by the documents. All the terms disclosed herein may be described by the standard documents.

Although the description focuses primarily on 3GPP LTE/LTE-A/NR (New RAT) for clarity, the technical features of the disclosure are not limited thereto.

As smartphones and Internet-of-things (IoT) devices proliferate, the amount of information exchanged over a communication network increases. Thus, an environment (e.g., enhanced mobile broadband communication) for more quickly providing services to more users than legacy communication systems (or legacy radio access technology) do needs to be taken into account for next-generation radio access technology.

To that end, communication systems under discussion consider machine type communication (MTC) that connects multiple devices and objects together and provides services. Also discussed are communication systems (e.g., ultra-reliable and low latency communication (URLLC)) that take account of communication reliability and/or latency-sensitive services and/or terminals.

For illustration purposes, the next generation radio access technology may be referred to below as new radio access technology (new RAT or NR), and NR-applied wireless communication system may be referred to as an NR system.

Terminology eLTE eNB: eLTE eNB is an evolution of eNB supporting connectivity to EPC and NGC.

gNB: A node supporting NR as well as connectivity with NGC.

New RAN: A radio access network interacting with NGC or supporting NR or E-UTRA.

Network slice: A network defined by the operator to provide the optimized solution on a specific market scenario with a specific requirement along with an end-to-end range.

Network function: A logical node in a network infrastructure with a well-defined functional operation and external interface.

NG-C: A control plane interface used at an NG2 reference point between new RAN and NGC.

NG-U: A user plane interface used at an NG3 reference point between new RAN and NGC.

Non-standalone NR: An arrangement in which gNB requires LTE eNB as an anchor for control plane connection to EPC or eLTE eNB as an anchor for control plane connection to NGC.

Non-standalone E-UTRA: An arrangement in which eLTE eNB requires gNB as an anchor for control plane connection to NGC.

User plane gateway: An end point of NG-U interface.

Overview of System

FIG. 1 is a view illustrating an example overall NR system structure to which a method as proposed in the disclosure may apply.

Referring to FIG. 1, an NG-RAN is constituted of gNBs to provide a control plane (RRC) protocol end for user equipment (UE) and NG-RA user plane (new AS sublayer/PDCP/RLC/MAC/PHY).

The gNBs are mutually connected via an $X_n$ interface.

The gNBs are connected to the NGC via the NG interface.

More specifically, the gNB connects to the access and mobility management function (AMF) via the N2 interface and connects to the user plane function (UPF) via the N3 interface.

New RAT (NR) Numerology and Frame Structure

In the NR system, a number of numerologies may be supported. Here, the numerology may be defined by the subcarrier spacing and cyclic prefix (CP) overhead. At this time, multiple subcarrier spacings may be derived by scaling the basic subcarrier spacing by integer N (or, μ). Further, although it is assumed that a very low subcarrier spacing is not used at a very high carrier frequency, the numerology used may be selected independently from the frequency band.

Further, in the NR system, various frame structures according to multiple numerologies may be supported.

Hereinafter, an orthogonal frequency division multiplexing (OFDM) numerology and frame structure that may be considered in the NR system is described.

The multiple OFDM numerologies supported in the NR system may be defined as shown in Table 1.

TABLE 1

| μ | $\Delta f = 2^\mu \cdot 15$ [kHz] | Cyclic prefix |
|---|---|---|
| 0 | 15 | Normal |
| 1 | 30 | Normal |
| 2 | 60 | Normal, Extended |
| 3 | 120 | Normal |
| 4 | 240 | Normal |

In connection with the frame structure in the NR system, the size of various fields in the time domain is expressed as a multiple of time unit $T_s=1/(\Delta f_{max} \cdot N_f)$. Here, $\Delta f_{max}=480 \cdot 10^3$, and $N_f=4096$. A downlink and uplink transmission is constituted of a radio frame with a period of $T_f=(\Delta_{max}N_f/100) \cdot T_s=10$ ms. Here, the radio frame is constituted of 10 subframes each of which has a period of $T_{sf}=(\Delta f_{max}N_f/1000 \cdot T_s=1$ ms. In this case, one set of frames for uplink and one set of frames for downlink may exist.

Figure 2:
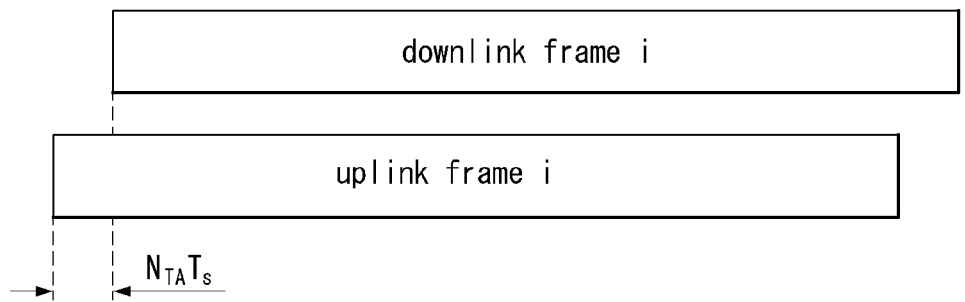
FIG. 2 illustrates the relationship between an uplink frame and downlink frame in a wireless communication system to which a method as proposed in the disclosure may apply.

FIG. 2 illustrates the relationship between an uplink frame and downlink frame in a wireless communication system to which a method as proposed in the disclosure may apply.

As shown in FIG. 2, transmission of uplink frame number i from the user equipment (UE) should begin $T_{TA}=N_{TA}T_s$ earlier than the start of the downlink frame number by the UE.

For numerology μ, slots are numbered in ascending order of $n_s^\mu \in \{0, \ldots, N_{subframes}^{slots,\,\mu}-1\}$ in the subframe and in ascending order of $n_{s,f}^\mu \in \{0, \ldots, N_{frame}^{slots,\,\mu}-1\}$ in the radio frame. One slot includes consecutive OFDM symbols of $N_{symb}^\mu$, and $N_{symb}^\mu$ is determined according to the used numerology and slot configuration. In the subframe, the start of slot $n_s^\mu$ is temporally aligned with the start of $n_s^\mu N_{symb}^\mu$.

All UEs are not simultaneously capable of transmission and reception, and this means that all OFDM symbols of the downlink slot or uplink slot may not be used.

Table 2 shows the number ($N_{symb}^{slot}$) of OFDM symbols per slot, the number ($N_{slot}^{frame,\mu}$) of slots per radio frame, and the number ($N_{slot}^{subframe,\mu}$) of slots per subframe in normal CP, and Table 3 shows the number of OFDM symbols per slot, the number of slots per radio frame, and the number of slots per subframe in extended CP.

TABLE 2

| μ | $N_{symb}^{slot}$ | $N_{slot}^{frame,\,\mu}$ | $N_{slot}^{subframe,\,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |

TABLE 3

| μ | $N_{symb}^{slot}$ | $N_{slot}^{frame,\,\mu}$ | $N_{slot}^{subframe,\,\mu}$ |
|---|---|---|---|
| 2 | 12 | 40 | 4 |

Figure 3:
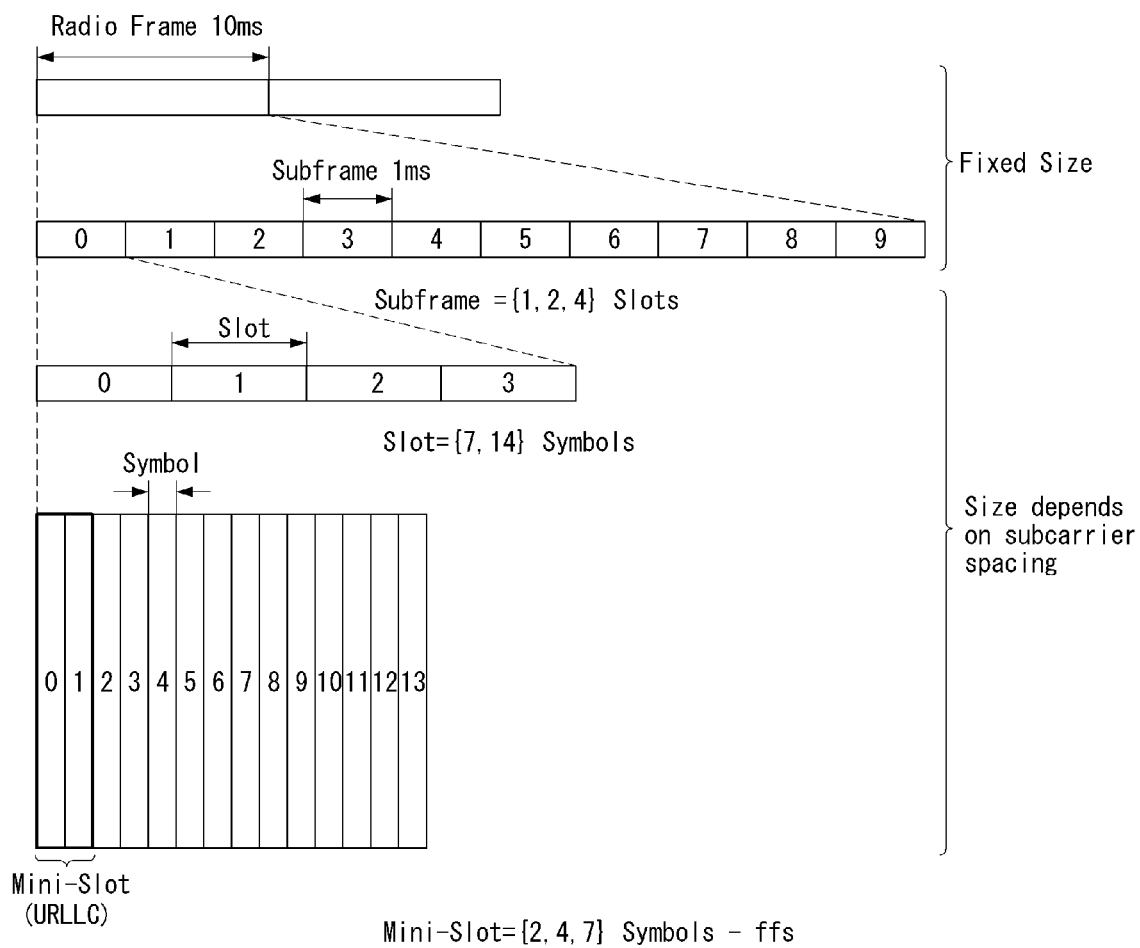
FIG. 3 illustrates an example frame structure in an NR system.

FIG. 3 illustrates an example frame structure in an NR system. FIG. 3 is intended merely for illustration purposes but not for limiting the scope of the disclosure.

Table 3 represents an example where μ=2, i.e., the subcarrier spacing (SCS) is 60 kHz. Referring to Table 2, one subframe (or frame) may include four slots. The "1 subframe={1,2,4} slots" in FIG. 3 is an example, and the number of slots that may be included in one subframe may be defined as shown in Table 2.

The mini-slot may consist of 2, 4, or 7 symbols or more or less symbols.

In connection with the physical resource in the NR system, antenna port, resource grid, resource element, resource block, and carrier part may be taken into consideration.

Hereinafter, the physical resources that may be considered in the NR system are described in detail.

First, in connection with antenna port, the antenna port is defined so that the channel carrying a symbol on the antenna port may be inferred from the channel carrying another symbol on the same antenna port. Where the large-scale property of the channel carrying a symbol on one antenna port may be inferred from the channel carrying a symbol on a different antenna port, the two antenna ports may be said to have a QC/QCL (quasi co-located or quasi co-location) relationship. Here, the large-scale properties include one or more of delay spread, Doppler spread, frequency shift, average received power, and received timing.

Figure 4:
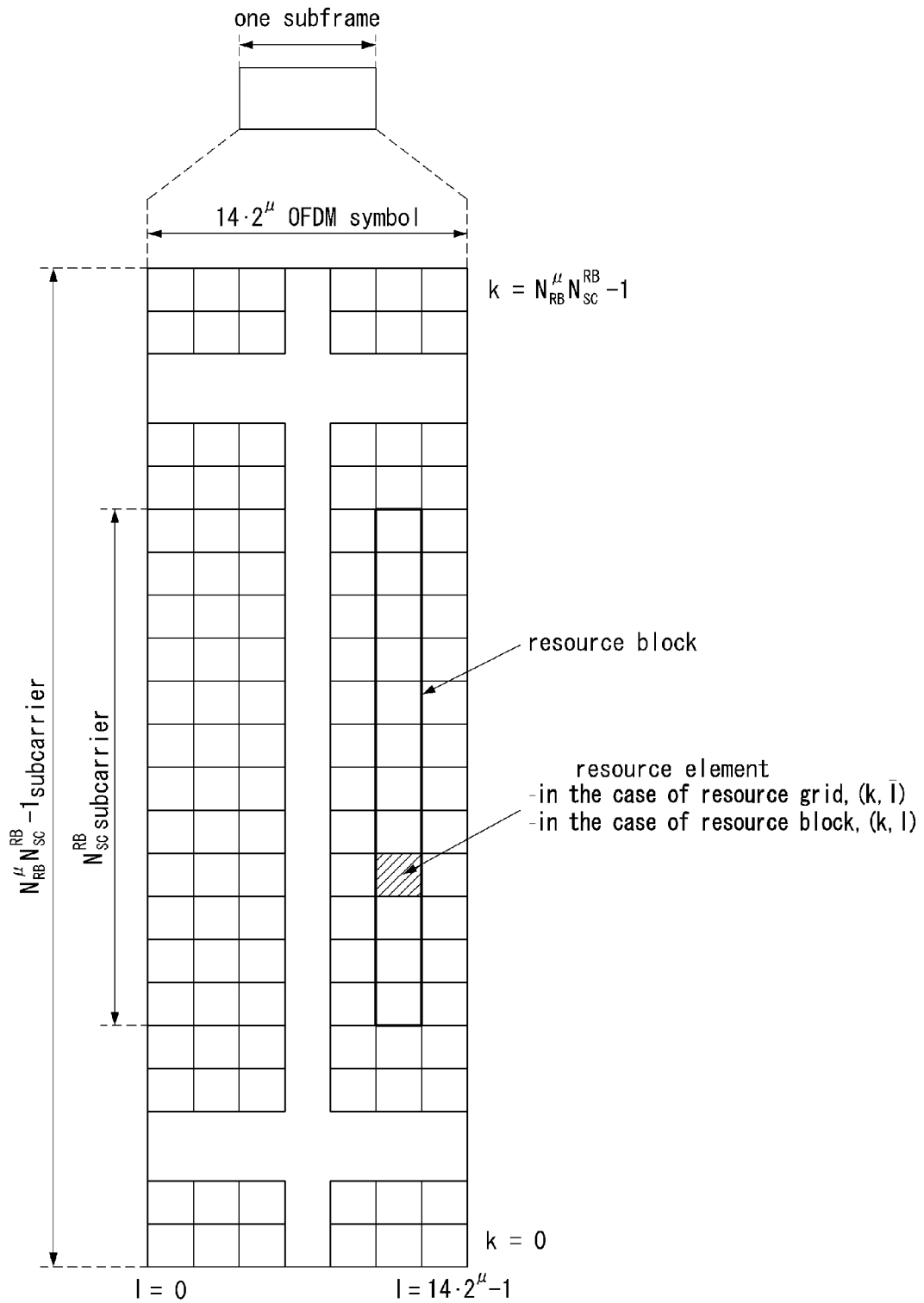
FIG. 4 illustrates an example resource grid supported in a wireless communication system to which a method as proposed in the disclosure may apply.

FIG. 4 illustrates an example resource grid supported in a wireless communication system to which a method as proposed in the disclosure may apply.

Referring to FIG. 4, although an example is described in which the resource grid is constituted of $N_{RB}^\mu N_{sc}^{RB}$ subcarriers in the frequency domain, and one subframe includes $14 \cdot 2^\mu$ OFDM symbols, embodiments of the disclosure are not limited thereto.

In the NR system, the transmitted signal is described with one or more resource grids constituted of $N_{RB}^\mu N_{sc}^{RB}$ subcarriers and $2^\mu N_{symb}^{(\mu)}$ OFDM symbols. Here, $N_{RB}^\mu \leq N_{RB}^{max,\mu} \cdot N_{RB}^{max,\mu}$ refers to the maximum transmission bandwidth, and this may be varied between uplink and downlink as well as numerologies.

Figure 5:
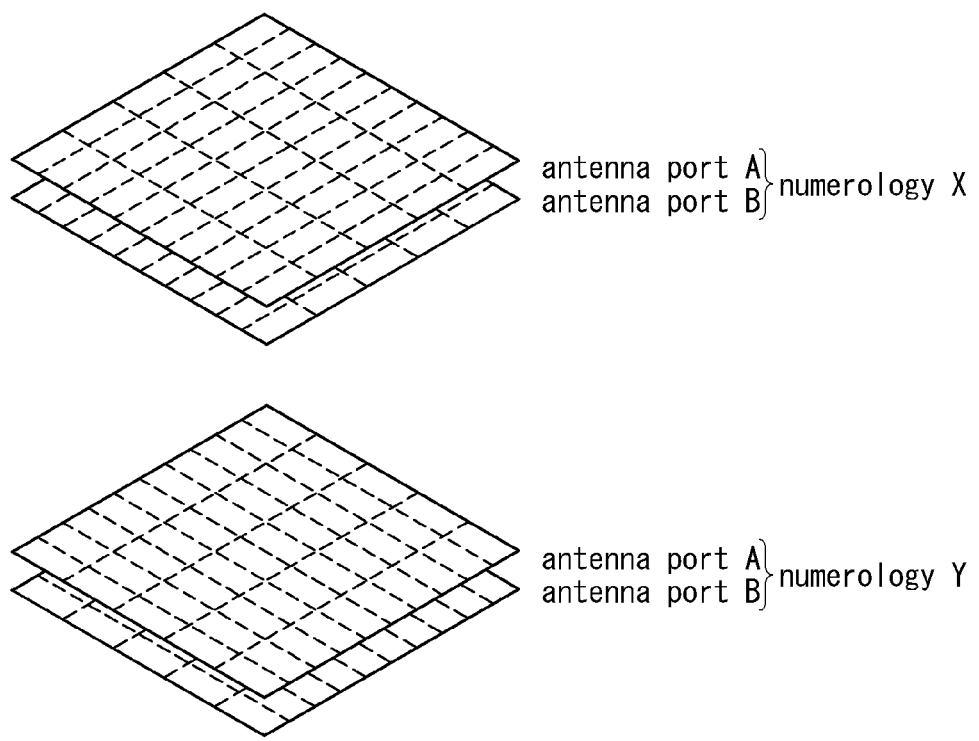
FIG. 5 illustrates examples of per-antenna port and numerology resource grids to which a method as proposed in the disclosure may apply.

In this case, as shown in FIG. 5, one resource grid may be configured per numerology μ and antenna port p.

FIG. 5 illustrates examples of per-antenna port and numerology resource grids to which a method as proposed in the disclosure may apply.

Each element of the resource grid for numerology μ and antenna port p is denoted a resource element and is uniquely identified by index pair (k,l). Here, k=0, ..., $N_{RB}^\mu N_{sc}^{RB}-1$ is the index in the frequency domain, and l=0, ..., $2^\mu N_{symb}^{(\mu)}-1$ denotes the position of symbol in the subframe. Upon denoting the resource element in slot, index pair (k,l) is used. Here, $l=0, \ldots, N_{symb}^\mu-1$.

For numerology $\mu$ and antenna port, resource element (k, l) corresponds to complex value $a_{k,l}^{(p,\mu)}$. Where there is no risk of confusion or where a specific antenna port or numerology is not specified, indexes p and $\mu$ may be dropped and, as a result, the complex value may become $a_{k,l}^{(p)}$ or $a_{k,l}$.

The physical resource block is defined with $N_{sc}^{RB}=12$ consecutive subcarriers in the frequency domain.

Point A plays a role as a common reference point of the resource block grid and may be obtained as follows.

offsetToPointA for PCell downlink refers to the frequency offset between point A and the lowest subcarrier of the lowest resource block overlapping the SS/PBCH block used by the UE for initial cell selection and is represented with resource block units assuming a subcarrier interval of 15 kHz for FR1 and a subcarrier interval of 60 kHz for FR2;

absoluteFrequencyPointA refers to the frequency-position of point A expressed as in the absolute radio-frequency channel number (ARFCN).

The common resource blocks are numbered up from zero in the frequency domain for subcarrier spacing configuration $\mu$.

The center of subcarrier 0 of common resource block 0 for subcarrier spacing configuration $\mu$ matches 'point A.'. In the frequency domain, resource elements (k,l) for common resource block number $n_{CRB}^\mu$ and subcarrier spacing configuration $\mu$ may be given as Equation 1 below.

$$n_{CRB}^\mu = \left\lfloor \frac{k}{N_{sc}^{RB}} \right\rfloor \quad \text{[Equation 1]}$$

Here, k may be defined relative to point A so that k=0 corresponds to the subcarrier with point A centered. The physical resource blocks are numbered from 0 to $N_{BWP,i}-1$ the bandwidth part (BWP), and i is the number of the BWP. In BWP i, the relationship between physical resource block $n_{PRB}$ and common resource block $n_{CRB}$ may be given as Equation 2 below.

$$n_{CRB}=n_{PRB}+N_{BWP,i}^{start} \quad \text{[Equation 2]}$$

Here, $N_{BWP,i}^{start}$ may be common resource blocks in which the BWP starts relative to common resource block 0.

Self-Contained Structure

The time division duplexing (TDD) structure considered in the NR system is a structure that processes uplink (UL) and downlink (DL) in one slot (or subframe). This is for minimizing data transmission latency in the TDD system, and the structure may be denoted a self-contained structure or self-contained slot.

Figure 6:
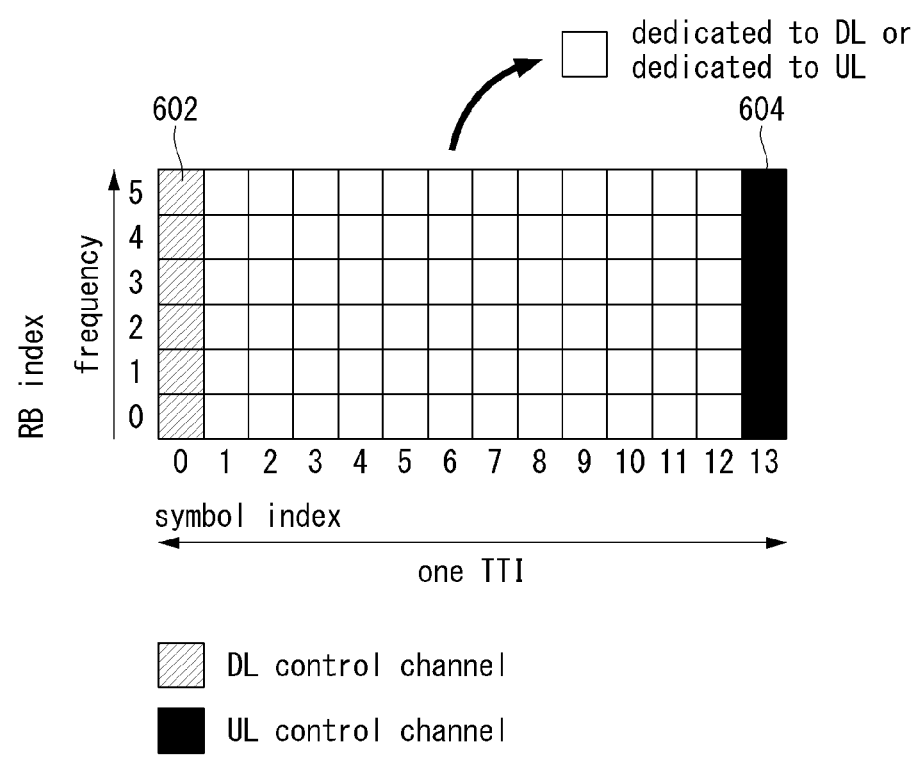
FIG. 6 illustrates an example self-contained structure to which a method proposed herein is applicable.

FIG. 6 illustrates an example self-contained structure to which a method proposed herein is applicable. FIG. 5 is intended merely for illustration purposes but not for limiting the scope of the disclosure.

Referring to FIG. 6, it is hypothesized that as in the case of legacy LTE, one transmission unit (e.g., slot or subframe) is constituted of 14 orthogonal frequency division multiplexing (OFDM) symbols.

In FIG. 6, region 602 means the downlink control region, and region 604 means the uplink control region. The other regions (not separately marked) than regions 602 and 604 may be used for transmission of downlink data or uplink data.

In other words, uplink control information and downlink control information may be transmitted in one self-contained slot. In contrast, for data, uplink data or downlink data may be transmitted in one self-contained slot.

Where the structure shown in FIG. 6 is used, downlink transmission and uplink transmission may be sequentially performed in one self-contained slot, and transmission of downlink data and reception of uplink ACK/NACK may be performed.

Resultantly, where an error occurs in data transmission, the time required for retransmission of data may reduce. By so doing, latency related to data transfer may be minimized.

In the self-contained slot structure as shown in FIG. 6, a time gap is required for a switching from transmission mode to reception mode or from reception mode to transmission mode by the base station (eNodeB, eNB, gNB) and/or the terminal (user equipment (UE)). In connection with the time gap, where uplink transmission is performed after downlink transmission in the self-contained slot, some OFDM symbol(s) may be set as a guard period (GP).

Analog Beamforming

In mmWave (mmW) communication systems, as signal wavelength shortens, multiple antennas may be installed in the same area. For example, in a 30 GHz band, the wavelength is about 1 cm, and if antennas are installed at 0.5 lambda intervals on a 5 cm×5 cm panel according to a 2-dimensional array, a total of 100 antenna elements may be installed.

Thus, coverage and throughput may be increased by raising the beamforming (BF) gain using multiple antenna elements in mmW communication systems.

In this case, the installation of a transceiver unit (TXRU) to enable adjustment of transmission power and phase per antenna element allows for independent beamforming per frequency resource.

However, installing TXRUs for all the antenna elements (e.g., 100 antenna elements) may lose practicability in light of costs. Thus, it may be considered to map multiple antenna elements to one TXRU and control the beam direction using an analog phase shifter.

Suh analog beamforming scheme may generate only one beam direction over the full band and is thus incapable of frequency-selective beam operation.

Thus, hybrid beamforming may be taken into account. Hybrid beamforming is an intermediate form between digital beamforming and analog beamforming and has B TXRUs fewer than Q antenna elements. In this case, although there are differences in connections between B TXRUs and Q antenna elements, the number of beam directions in which simultaneous signal transmission is possible is limited to B or less.

SUMMARY OF THE DISCLOSURE

In the NR system, the base station may configure a hopping, in particular, an intra-slot hopping, of a sounding reference signal (SRs) in the UE. Here, intra-slot hopping may mean a hopping in the SRS resource-configured slot.

Such SRS hopping may be used to raise the accuracy of UL channel measurement via a scheme in which transmission (tx) power-insufficient UE concentrates transmission power and performs transmission. In this case, the UE and/or base station may be configured or defined to transmit/receive the SRS over the full SRS bandwidth given (i.e., allocated).

In connection with NR system SRS hopping, the following may be considered.

First, in the case of an aperiodic SRS resource which is N symbols (e.g., two symbols or four symbols), the NR system may support an intra-slot hopping in the bandwidth part (BWP). At this time, all of the N OFDM symbols may be positioned adjacent to each other in the same slot by a definition of the SRS resource.

Where only frequency hopping is configured, in each of the N symbols of the SRS resource, the subband of the same size of the hopping bandwidth is sounded (or configured), and the full hopping bandwidth may be sounded (or configured) over the N OFDM symbols. In particular, if N is 4, and frequency hopping and repetition are configured, the subband of the same size of the hopping band may be sounded, and the full hopping bandwidth may be sounded over two pairs of OFDM symbols. A hopping design formula in the NR system may use a formula for legacy system (e.g., LTE system) as a starting point.

A periodic or semi-persistent SRS resource which is N symbols is described below. Where N is 1, inter-slot hopping in the BWP may be supported. Here, inter-slot hopping may mean a hopping between SRS resource-configured slots. In contrast, when N is 2 or 4, inter-slot hopping and inter-slot hopping in the BWP may be supported. In this case, repetition may be configured. In each slot, the SRS resource constituted of N symbols may occupy the same symbol location. Further, a hopping design formula in the NR system may use a formula for legacy system (e.g., LTE system) as a starting point.

In other words, as described above, intra slot hopping may be performed for an aperiodic SRS (according to the repetition factor) and, at this time, hopping should be able to cover the full bandwidth configured in the UE. Further, in the case of hopping for an SRS in the NR system, the hopping function used in the LTE system is used, as it is, for periodic/semi-persistent SRS and, for an aperiodic SRS, a new hopping function may be defined.

Specifically, the following may be considered in connection with SRS hopping in the NR system.

A frequency hopping of SRS may be configured by parameter $b_{hop} \in \{0, 1, 2, 3\}$, the parameter may be given by the b-hop field included in the higher layer parameter freqHopping.

First, a configuration related to the SRS bandwidth may be set as in Table 4 below.

TABLE 4

| $C_{SRS}$ | $B_{SRS}=0$ $m_{SRS,0}$ | $N_0$ | $B_{SRS}=1$ $m_{SRS,1}$ | $N_1$ | $B_{SRS}=2$ $m_{SRS,2}$ | $N_2$ | $B_{SRS}=3$ $m_{SRS,3}$ | $N_3$ |
|---|---|---|---|---|---|---|---|---|
| 0 | 4 | 1 | 4 | 1 | 4 | 1 | 4 | 1 |
| 1 | 8 | 1 | 4 | 2 | 4 | 1 | 4 | 1 |
| 2 | 12 | 1 | 4 | 3 | 4 | 1 | 4 | 1 |
| 3 | 16 | 1 | 4 | 4 | 4 | 1 | 4 | 1 |
| 4 | 16 | 1 | 8 | 2 | 4 | 2 | 4 | 1 |
| 5 | 20 | 1 | 4 | 5 | 4 | 1 | 4 | 1 |
| 6 | 24 | 1 | 4 | 6 | 4 | 1 | 4 | 1 |
| 7 | 24 | 1 | 12 | 2 | 4 | 3 | 4 | 1 |
| 8 | 28 | 1 | 4 | 7 | 4 | 1 | 4 | 1 |
| 9 | 32 | 1 | 16 | 2 | 8 | 2 | 4 | 2 |
| 10 | 36 | 1 | 12 | 3 | 4 | 3 | 4 | 1 |
| 11 | 40 | 1 | 20 | 2 | 4 | 5 | 4 | 1 |
| 12 | 48 | 1 | 16 | 3 | 8 | 2 | 4 | 2 |
| 13 | 48 | 1 | 24 | 2 | 12 | 2 | 4 | 3 |
| 14 | 52 | 1 | 4 | 13 | 4 | 1 | 4 | 1 |
| 15 | 56 | 1 | 28 | 2 | 4 | 7 | 4 | 1 |
| 16 | 60 | 1 | 20 | 3 | 4 | 5 | 4 | 1 |
| 17 | 64 | 1 | 32 | 2 | 16 | 2 | 4 | 4 |
| 18 | 72 | 1 | 24 | 3 | 12 | 2 | 4 | 3 |
| 19 | 72 | 1 | 36 | 2 | 12 | 3 | 4 | 3 |
| 20 | 76 | 1 | 4 | 19 | 4 | 1 | 4 | 1 |
| 21 | 80 | 1 | 40 | 2 | 20 | 2 | 4 | 5 |
| 22 | 88 | 1 | 44 | 2 | 4 | 11 | 4 | 1 |
| 23 | 96 | 1 | 32 | 3 | 16 | 2 | 4 | 4 |
| 24 | 96 | 1 | 48 | 2 | 24 | 2 | 4 | 6 |
| 25 | 104 | 1 | 52 | 2 | 4 | 13 | 4 | 1 |
| 26 | 112 | 1 | 56 | 2 | 28 | 2 | 4 | 7 |
| 27 | 120 | 1 | 60 | 2 | 20 | 3 | 4 | 5 |
| 28 | 120 | 1 | 40 | 3 | 8 | 5 | 4 | 2 |
| 29 | 120 | 1 | 24 | 5 | 12 | 2 | 4 | 3 |
| 30 | 128 | 1 | 64 | 2 | 32 | 2 | 4 | 8 |
| 31 | 128 | 1 | 64 | 2 | 16 | 4 | 4 | 4 |
| 32 | 128 | 1 | 16 | 8 | 8 | 2 | 4 | 2 |
| 33 | 132 | 1 | 44 | 3 | 4 | 11 | 4 | 1 |
| 34 | 136 | 1 | 68 | 2 | 4 | 17 | 4 | 1 |
| 35 | 144 | 1 | 72 | 2 | 36 | 2 | 4 | 9 |
| 36 | 144 | 1 | 48 | 3 | 24 | 2 | 12 | 2 |
| 37 | 144 | 1 | 48 | 3 | 16 | 3 | 4 | 4 |
| 38 | 144 | 1 | 16 | 9 | 8 | 2 | 4 | 2 |
| 39 | 152 | 1 | 76 | 2 | 4 | 19 | 4 | 1 |
| 40 | 160 | 1 | 80 | 2 | 40 | 2 | 4 | 10 |
| 41 | 160 | 1 | 80 | 2 | 20 | 4 | 4 | 5 |
| 42 | 160 | 1 | 32 | 5 | 16 | 2 | 4 | 4 |
| 43 | 168 | 1 | 84 | 2 | 28 | 3 | 4 | 7 |
| 44 | 176 | 1 | 88 | 2 | 44 | 2 | 4 | 11 |
| 45 | 184 | 1 | 92 | 2 | 4 | 23 | 4 | 1 |
| 46 | 192 | 1 | 96 | 2 | 48 | 2 | 4 | 12 |
| 47 | 192 | 1 | 96 | 2 | 24 | 4 | 4 | 6 |
| 48 | 192 | 1 | 64 | 3 | 16 | 4 | 4 | 4 |
| 49 | 192 | 1 | 24 | 8 | 8 | 3 | 4 | 2 |
| 50 | 208 | 1 | 104 | 2 | 52 | 2 | 4 | 13 |
| 51 | 216 | 1 | 108 | 2 | 36 | 3 | 4 | 9 |
| 52 | 224 | 1 | 112 | 2 | 56 | 2 | 4 | 14 |
| 53 | 240 | 1 | 120 | 2 | 60 | 2 | 4 | 15 |
| 54 | 240 | 1 | 80 | 3 | 20 | 4 | 4 | 5 |
| 55 | 240 | 1 | 48 | 5 | 16 | 3 | 8 | 2 |
| 56 | 240 | 1 | 24 | 10 | 12 | 2 | 4 | 3 |
| 57 | 256 | 1 | 128 | 2 | 64 | 2 | 4 | 16 |
| 58 | 256 | 1 | 128 | 2 | 32 | 4 | 4 | 8 |
| 59 | 256 | 1 | 16 | 16 | 8 | 2 | 4 | 2 |
| 60 | 264 | 1 | 132 | 2 | 44 | 3 | 4 | 11 |
| 61 | 272 | 1 | 136 | 2 | 68 | 2 | 4 | 17 |
| 62 | 272 | 1 | 68 | 4 | 4 | 17 | 4 | 1 |
| 63 | 272 | 1 | 16 | 17 | 8 | 2 | 4 | 2 |

In Table 4, $C_{srs}$ may mean the Row selector for an SRS bandwidth-related configuration, and $B_{srs}$ may mean the Column selector for an SRS bandwidth-related configuration. Further, $m_{srs,0}$ m may mean the full SRS bandwidth, and the $N_b$ value (b is 0 to 3) may mean the number of hopping units split into for SRS hopping.

If $b_{hop} < B_{SRS}$, frequency hopping is enabled, and the frequency location index $n_b$ may be given by Equation 3.

$$n_b = \begin{cases} \lfloor 4n_{RRC}/m_{SRS,b} \rfloor \bmod N_b & b \le b_{hop} \\ \{F_b(n_{SRS}) + \lfloor 4n_{RRC}/m_{SRS,b} \rfloor\} \bmod N_b & \text{otherwise} \end{cases} \quad \text{[Equation 3]}$$

In Equation 3, $n_{RRC}$ may be given by the higher layer parameter freqDomainPosition and, for the $m_{sRs,b}$ value and $b=B_{sRs}$ (i.e., B_SRS), $N_b$ may be given as a value corresponding to the set value for $C_{SRS}$ (i.e., C_SRS) in Table 4 above.

Further, $F_b(n_{SRS})$ may be given by Equation 4 below, where, regardless of $N_b$, $N_b$, $b_{b\_hop}$ may be 1.

$$F_b(n_{SRS}) = \begin{cases} (N_b/2) \left\lfloor \dfrac{n_{SRS} \bmod \prod_{b'=b_{hop}}^{b} N_{b'}}{\prod_{b'=b_{hop}}^{b-1} N_{b'}} \right\rfloor + \\ \qquad\qquad\qquad\qquad\qquad\qquad \text{if } N_b \text{ even} \\ \left\lfloor \dfrac{n_{SRS} \bmod \prod_{b'=b_{hop}}^{b} N_{b'}}{2 \prod_{b'=b_{hop}}^{b-1} N_{b'}} \right\rfloor \\ \lfloor N_b/2 \rfloor \left\lfloor n_{SRS} \Big/ \prod_{b'=b_{hop}}^{b-1} N_{b'} \right\rfloor \quad \text{if } N_b \text{ odd} \end{cases}$$ [Equation 4]

In Equation 4, n_SRS (i.e., n_SRS) may count the number of SRS transmissions. In other words, n_SRS may mean the progress interval of hopping in the time domain.

Further, where the SRS resource is aperiodically configured by the higher layer parameter resourceType, in the slot where the SRS resource which is $N_{symb}^{SRS}$ symbols, Equation 4 may be given by $n_{SRS}=\lfloor l'/R \rfloor$. Further, $R(R \leq N_{sym}^{SRS})$ may mean the repetition factor given by the repetitionFactor included in the higher layer parameter resourceMapping.

Further, where the SRS resource is periodically or semi-persistently configured by the higher layer parameter resourceType, the SRS counter (i.e., $n_{sRs}$) may be given by Equation 5 below.

$$n_{SRS} = \left( \dfrac{N_{slot}^{frame,\mu} n_f + n_{s,f}^{\mu} - T_{offset}}{T_{SRS}} \right) \cdot \left( \dfrac{N_{symb}^{SRS}}{R} \right) + \left\lfloor \dfrac{l'}{R} \right\rfloor$$ [Equation 5]

In Equation 5, the slot meets the conditions of Equation 6 below, $T_{SRS}$ may mean the periodicity for SRS resource in slots, and $T_{offset}$ may mean the slot offset for SRS resource. Further, $(N_{slot}^{frame,\mu} n_{s,f}^{\mu} - T_{offset}) \bmod T_{SRS} = 0$ [Equation 6]

In Equations 5 and 6, $N_{slot}^{frame,\mu}$ means the number of slots in one frame for the subcarrier spacing/cyclic prefix determined by μ, $n_f$ may mean the frame number, $n_{s,f}^{\mu}$ may mean the slot number, and $N_{symb}^{SRS}$ may mean the number of symbols where the SRS is to be transmitted.

In other words, if B_SRS is larger than b_hop, a hopping pattern may be determined for B_SRS value(s) larger than b_hop. According to each B_SRS (i.e., b), for the SRS bandwidth (i.e., m_SRS,(b−1)) designated in (b−1) and C_SRS, it is divided in a number N_b, for as many bandwidth units as m_SRS,b designated as B_SRS (i.e., b), and hopping may be performed in the corresponding SRS bandwidth.

Figure 7:
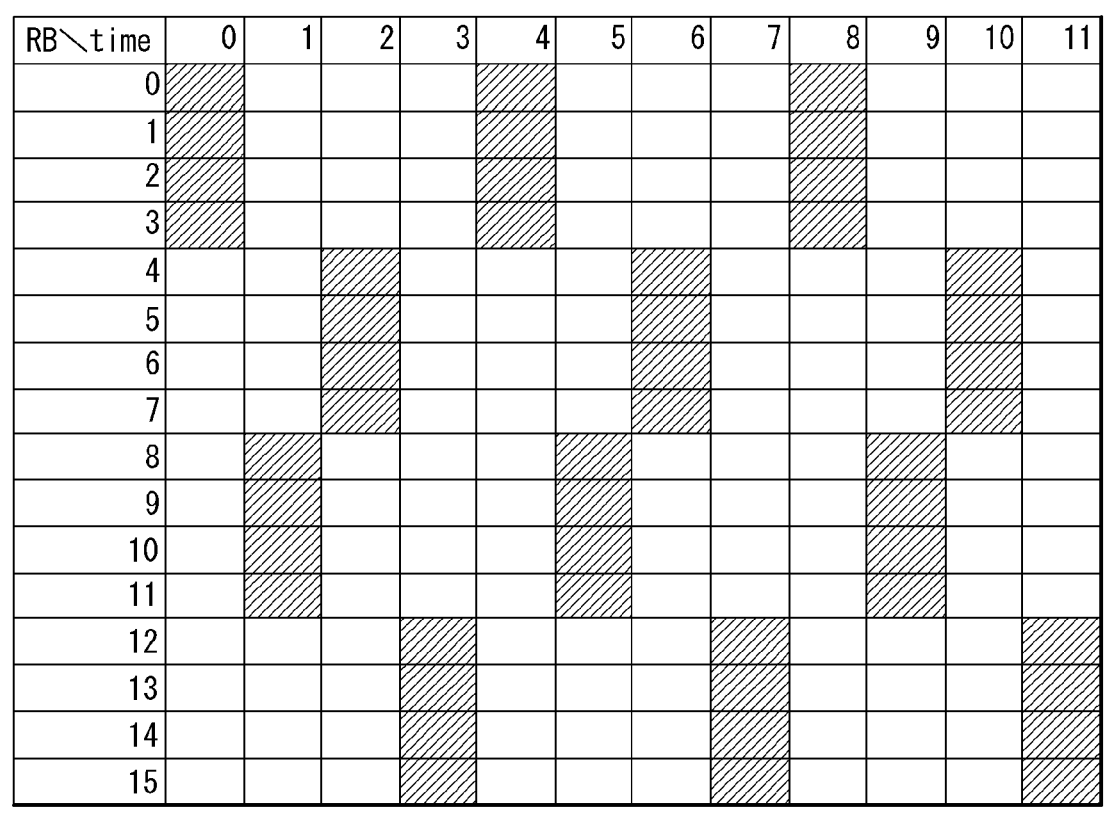

FIG. 7 illustrates an example SRS hopping pattern that may be considered in an NR system. FIG. 7 is intended merely for illustration purposes but not for limiting the scope of the disclosure.

Referring to FIG. 7, in Table 4, an SRS hopping pattern is shown when C_SRS=3, B_SRS=1, and b_hop=0. In other words, m_SRS,0 is 16, m_SRS,1 is 4, and N_1 is set to 4.

In this case, the full SRS bandwidth is set to 16 RB, hopping is performed over four symbols, and hopping may be performed in units of four RBs.

The base station may configure repetition factor R, which is the number of symbols where SRS symbols are repeated, in the UE, and intra-slot hopping may be performed for the case where N is larger than R (i.e., N>R). Here, N may mean the number of symbols configured as the SRS resource (e.g., $N_{sym}^{SRS}$).

In the case of periodic and/or semi-persistent SRS (i.e., each P-SRs or S-SRS), inter-slot hopping, other than intra-slot hopping, may be configured to cover the full SRS bandwidth over several slots. However, in the case of an SRS (e.g., aperiodic SRS) in which only intra-slot hopping is performed in one slot, such an occasion may arise where each SRS is unable to hop the full bandwidth (i.e., the full SRs bandwidth) according to the C_SRS.

For example, such an occasion may occur where each SRS may not hop the full SRS bandwidth as shown in FIG. 8.

FIG. 8 illustrates another example SRS hopping pattern that may be considered in an NR system. FIG. 8 is intended merely for illustration purposes but not for limiting the scope of the disclosure.

Referring to FIG. 8, such a case is hypothesized where N_1=5 when C_SRS=5 and B_SRS=1, and four symbols are configured as the SRS transmission resource in the slot in Table 4. At this time, the bandwidth and hopping unit may be configured by Table 5 below.

TABLE 5

| | $B_{SRS} = 0$ | | $B_{SRS} = 1$ | | $B_{SRS} = 2$ | | $B_{SRS} = 3$ | |
|---|---|---|---|---|---|---|---|---|
| $C_{SRS}$ | $m_{SRS,0}$ | $N_0$ | $m_{SRS,1}$ | $N_1$ | $m_{SRS,2}$ | $N_2$ | $m_{SRS,3}$ | $N_3$ |
| 5 | 20 | 1 | 4 | 5 | 4 | 1 | 4 | 1 |

Since N_1 is 5 as shown in FIG. 8, hopping may be performed in five units each constituted of four RBs. At this time, if the SRS is constituted of only four symbols in the slot, the remaining one hopping unit may not be placed in the slot. In other words, the SRS region in the slot defined with a maximum of four symbols may not cover the full SRS bandwidth.

As such, if intra-slot alone, but without inter-slot hopping, is used, such an occasion may arise where the full SRS bandwidth may not be covered. Thus, in a specific C_SRS (or the SRS bandwidth corresponding thereto), intra-slot hopping may not be performed efficiently.

Thus, the disclosure proposes methods for such configuration that intra-slot hopping is applicable to the full SRS bandwidth configured in the UE. Further, the embodiments and/or methods described in the disclosure are differentiated solely for ease of description, and some components in any one method may be replaced, or combined with components of another method.

Method 1)

First, regardless of B_SRS and N_b configured (or defined), N_b may be set (or overridden) as a specific value and, thus, m_SRS,b may be determined. As an example, N_b may be determined to be one value among {1, 2} or {1, 4}. In this case, given the number (e.g., four) of SRS symbols configurable, it may be efficient to set the product of the N_b values for the specific C_SRS as 4 or 2.

Tables 6 and 7 below show example SRS bandwidth configurations when N_b is fixed to specific values. Table 6 shows an example in which N_b is fixed to one value among {1, 2}, and Table 7 shows an example in which N_b is fixed to one value among {1, 4}.

TABLE 6

| | $B_{SRS} = 0$ | | $B_{SRS} = 1$ | | $B_{SRS} = 2$ | | $B_{SRS} = 3$ | |
|---|---|---|---|---|---|---|---|---|
| $C_{SRS}$ | $m_{SRS, 0}$ | 1 | $m_{SRS, 1} = m_{SRS, 0}/4$ | $N_1 = 4$ | $m_{SRS, 2} = m_{SRS, 1}$ | $N_2 = 1$ | $m_{SRS, 3} = m_{SRS, 2}$ | $N_3 = 1$ |

TABLE 7

| | $B_{SRS} = 0$ | | $B_{SRS} = 1$ | | $B_{SRS} = 2$ | | $B_{SRS} = 3$ | |
|---|---|---|---|---|---|---|---|---|
| $C_{SRS}$ | $m_{SRS, 0}$ | 1 | $m_{SRS, 1} = m_{SRS, 0}/2$ | $N_1 = 2$ | $m_{SRS, 2} = m_{SRS, 1}/2$ | $N_2 = 2$ | $m_{SRS, 3} = m_{SRS, 2}$ | $N_3 = 1$ |

Considering the case where a hopping of SRS resource occurs over two symbols or three symbols, defining N_b=2 for at least one B_SRS (in particular, B_SRS=1) as shown in Table 7 may be advantageous in applying SRS hopping over the full SRS bandwidth. As an example, where SRS hopping is carried out over three symbols, hopping may be performed two times in the units of half of the SRS bandwidth over a total of three symbols. Thus, some band happens to allow an overlap of SRS transmissions.

In this case, sets of multiple N_b values (i.e., N_b value sets) according to SRS hopping may be predetermined (i.e., predefined), and a method in which the base station configures (or indicates or designates) an N_b value set to be applied to the SRS hopping in the UE may be considered. As an example, the N_b value sets may be set to {N1=4, N2=1} or {N1=2, N2=2}. At this time, the base station may designate a specific N_b value set in the UE via high layer signaling (e.g., SRS resource configuration in RRC signaling, MAC signaling, i.e., MAC-CE) and/or physical layer signaling (e.g., downlink control information (DCI)) and may configure (or override) the designated B_SRS and/or N_b value with C_SRS.

Further, in connection with the SRS in the NR system, a comb value {1, 2, 4} may be allowed for the SRS pattern in the RB. As an example, where the comb value is 2, the SRS resource element (RE) may be configured to be mapped one per two REs and occupy 6RE in the RB.

sequence) used in the SRS. Further, given that the comb is configured for multiplexing between UEs, the base station may advantageously adjust the transmission timing of aperiodic SRS to avoid an SRS collision.

Or, a method of suing a Zadoff-Chu sequence of length 6 for SRS may be further considered. In this case, the above-described SRS comb may be limited to 1 or 2, and the Zadoff-Chu sequence of length 6 may be used when the comb is 2. To that end, if the comb value is set to 4, the configuration may be overridden to the comb value 2. The comb value 2 may be used when N_b=2.

At this time, the Zadoff-Chu sequence of length 6 may be replaced with a computer-based sequence of the same length.

Method 2)

Next, a method of letting interwork (or associating) each value (e.g., m_SRS or N_b) related to SRS hopping with the number of symbols (groups) where the SRS hops may be considered. Here, the number of symbols where the SRS hops may be the value resultant from dividing the number of symbols (i.e., N) of the SRS resource by the repetition factor (i.e., R).

Tables 8 and 9 show example SRS bandwidth configurations when a specific m_SRS and/or N_b is associated with the number of SRS hopping symbols.

TABLE 8

| | $B_{SRS} = 0$ | | $B_{SRS} = 1$ | | $B_{SRS} = 2$ | | $B_{SRS} = 3$ | |
|---|---|---|---|---|---|---|---|---|
| $C_{SRS}$ | $m_{SRS, 0}$ | $N_0$ | $m_{SRS, 1} = m_{SRS, 0}/N_1$ | $N_1 = N/R$ | $m_{SRS, 2} = m_{SRS, 1}$ | $N_2 = 1$ | $m_{SRS, 3} = m_{SRS, 2}$ | $N_3 = 1$ |

TABLE 9

| | $B_{SRS} = 0$ | | $B_{SRS} = 1$ | | $B_{SRS} = 2$ | | $B_{SRS} = 3$ | |
|---|---|---|---|---|---|---|---|---|
| $C_{SRS}$ | $m_{SRS, 0}$ | $N_0$ | $m_{SRS, 1} = m_{SRS, 0}/2$ | $N_1 = 2$ | $m_{SRS, 2} = m_{SRS, 1}/N_2$ | $N_2 = N/(R \times N_1)$ | $m_{SRS, 3} = m_{SRS, 2}$ | $N_3 = 1$ |

By applying the above-described method, if only intra-slot hopping is configured (or in its equivalent context) to ensure orthogonality between SRS sequences using cyclic shift, the SRS comb value may be fixed to a specific value (e.g., 1) regardless of configurations (e.g., SRS configuration). In this method, it may be advantageous to maintain the number of SRS REs in each m_SRS as a multiple of 12 for cyclic shift 8 (in the case of comb 2) or cyclic shift 12 (in the case of comb 4) of the sequence (e.g., Zadoff-Chu At this time, if setting the number of symbols for SRS transmission to 3 in the case of Table 8 (i.e., N=3) is allowed, N_1 may be $\lfloor N/2R \rfloor \times 2$. Further, if setting the number of symbols for SRS transmission to 3 in the case of Table 9 (i.e., N=3) is allowed, N_2 may be $(\lfloor N/2R \rfloor \times 2)/N_1$.

Also in this case, similar to what has been described above in connection with method 1, sets of multiple N_b values (i.e., N_b value sets) according to SRS hopping may be predetermined (i.e., predefined), and a method in which the base station configures (or indicates or designates) an N_b value set to be applied to the SRS hopping in the UE may be considered. As an example, sets of N_b values may be set as shown in Tables 8 and 9. At this time, the base station may designate a specific N_b value set in the UE via high layer signaling (e.g., SRS resource configuration in RRC signaling, MAC signaling, i.e., MAC-CE) and/or physical layer signaling (e.g., downlink control information (DCI)).

Further, similar to what has been described above in connection with method 1, a method of determining a comb value to be applied to the SRS in relation to SRS in the NR system may be considered.

In other words, by applying the above-described method, if only intra-slot hopping is configured (or in its equivalent context) to ensure orthogonality between SRS sequences using cyclic shift, the SRS comb value may be fixed to a specific value (e.g., 1) regardless of configurations (e.g., SRS configuration). In this method, it may be advantageous to maintain the number of SRS REs in each m_SRS as a multiple of 12 for cyclic shift 8 (in the case of comb 2) or cyclic shift 12 (in the case of comb 4) of the sequence (e.g., Zadoff-Chu sequence) used in the SRS. Further, given that the comb is configured for multiplexing between UEs, the base station may advantageously adjust the transmission timing of aperiodic SRS to avoid an SRS collision.

Or, a method of suing a Zadoff-Chu sequence of length 6 for SRS may be further considered. In this case, the above-described SRS comb may be limited to 1 or 2, and the Zadoff-Chu sequence of length 6 may be used when the comb is 2. To that end, if the comb value is set to 4, the configuration may be overridden to the comb value 2. The comb value 2 may be used when N_b=2.

At this time, the Zadoff-Chu sequence of length 6 may be replaced with a computer-based sequence of the same length.

Method 3)

Further, a method of configuring to apply a value (C_SRS') smaller than the C_SRS configured in the UE to actual SRS transmission may be considered. In other words, if a C_SRS where intra-slot hopping is impossible is configured in the UE, the UE may interpret that a C_SRS meeting a specific condition among C_SRSs with the same m_SRS,0 as the configured C_SRS is to be applied to SRS transmission. As an example, the specific condition may be that the UE may use intra-slot hopping capable of covering the full SRS bandwidth configured in the UE in one slot.

Specifically, it is assumed that a C_SRS where intra-slot hopping is impossible is configured in the UE as shown in Table 10. Here, when a C_SRS where intra-slot hopping is impossible is configured may mean when the N_b value is set to be larger than the maximum number, 4, of SRS symbols.

Table 10 shows SRS bandwidth configurations when C_SRS is 27, 28, and 29 in Table 4.

TABLE 10

| $C_{SRS}$ | $B_{SRS} = 0$ | | $B_{SRS} = 1$ | | $B_{SRS} = 2$ | | $B_{SRS} = 3$ | |
|---|---|---|---|---|---|---|---|---|
| | $m_{SRS,0}$ | $N_0$ | $m_{SRS,1}$ | $N_1$ | $m_{SRS,2}$ | $N_2$ | $m_{SRS,3}$ | $N_3$ |
| 27 | 120 | 1 | 60 | 2 | 20 | 3 | 4 | 5 |
| 28 | 120 | 1 | 40 | 3 | 8 | 5 | 4 | 2 |
| 29 | 120 | 1 | 24 | 5 | 12 | 2 | 4 | 3 |

At this time, the UE may be configured to use the smallest one of the C_SRSs with the same m_SRS,0 (i.e., the same full SRS bandwidth) as the configured C_SRS. For example, in the case of an aperiodic SRS where only intra-slot hopping is configured although C_SRS=29 is configured in the UE by the base station in the case shown in Table 10, the C_SRS actually applied to SRS transmission may be C_SRS=27.

Or, where a C_SRS where intra-slot hopping is impossible is configured in the UE as shown in Table 10, the UE may use a value which is a one smaller value than the configured C_SRS as the actual C_SRS. For example, if only C_SRS=29 and intra-slot hopping are configured in the UE in Table 10, the UE may use C_SRS=28, not C_SRS=29, as the C_SRS to be actually applied. This scheme may be applied even where m_SRS,0 is not the same.

The above-described scheme may be used because in the case of the SRS (e.g., m_SRS0>=120 or m_SRS0>80) with a large bandwidth in which it is advantageous to use actual SRS frequency hopping, two or more C_SRSs are defined for the same SRS bandwidth (i.e., m_SRS,0), and the C_SRS with an N_b that may be problematic is configured at the end for the same SRS bandwidth. Thus, this scheme may be used in the period where a plurality of C_SRSs are configured for the same m_SRS,0, i.e., m_SRS,0>=120 (or similarly, where m_SRS,0>80 (i.e., C_SRS>=27 or C_SRS>20)).

This is available also for the other regions (i.e., m_SRS, 0<=76, or m_SRS,0<120) than the period. However, in this case, m_SRS,0 is reduced by 4 RB and, thus, such an occasion may arise where SRS transmission is impossible for some bandwidth. However, use of this scheme provides the advantage that the bandwidth where SRS is transmitted may be continuously configured.

Further, where C_SRS=24 is configured in the UE by the base station in an example other than the above-described example, the UE may interpret this as C_SRS=25 and perform SRS transmission.

Method 4)

Further, a method of defining a separate table to be used when only intra-slot hopping is configured in the UE may be considered. In other words, this is a method of configuring two SRS bandwidth configuration tables considering intra-slot hopping.

The separately configured table may be applied where the UE performs intra-slot hopping, where the table is configured to be separately used, and/or in its equivalent cases. At this time, the SRS bandwidth configuration table separately configured for intra-slot hopping may have the properties as shown in Equation 7 below.

$$\prod_b N_b \le (N/R) \qquad \text{[Equation 7]}$$

(for a given C_SRS)

Referring to Equation 7, in the table separately configured, the product of all of the N_b values corresponding to the given C_SRS may be set to a value not more than a specific value (N/R above). Here, N may denote the number of symbols configured for SRS transmission, and R may denote the repetition factor.

Method 5)

Further, a method of configuring an SRS transmission counting offset (e.g., $l_{offset}$) may be considered. Here, the SRS transmission counting offset may mean an offset for setting a counting time of SRS transmission, i.e., a time of calculation of the number of times of SRS transmission.

In relation to SRS transmission, the base station may configure (or indicate or designate) the UE's hopping pattern (i.e., an SRS hopping pattern) in the UE.

Specifically, the aperiodic SRS may use n_SRS as $n_{SRS} = \lfloor l'/R \rfloor$ in which case the aperiodic SRS may always use only the same hopping pattern (e.g., the first $N_{symb}^{SRS}$ hop of the hopping pattern determined by C_SRS and B_SRS). Thus, the part of the SRS bandwidth which is not covered may be identically configured at each time of SRS transmission, and the UE is unable to identically transmit SRS in a specific band (which may not be selected by the base station). Thus, although the UE transmits a plurality of aperiodic SRSs, such an occasion may arise where the full SRS bandwidth is not covered.

To address this issue, the following methods 5-1) to 5-5) may apply when the base station configures intra-slot hopping in the UE. These methods 5-1) to 5-5) may correspond to methods of configuring an offset of SRS transmission counting to address the issue that intra-slot hopping all is not covered. Methods 5-1) to 5-5) described below are differentiated solely for ease of description, and some components in any one method may be replaced, or combined with components of another method.

Method 5-1)

First, a method of determining an offset of SRS transmission counting according to the time of transmission (i.e., SRS transmission time) may be considered. In other words, an offset of SRS transmission counting may be configured in an implicit method.

Specifically, additionally to the existing n_SRS, an offset of different SRS transmission counting may be defined according to the transmission time (e.g., slot number). As an example, n_SRS defined by applying this scheme may be as shown in Equation 8 below.

$$n_{SRS} = \left(N_{slot}^{frame,\mu} n_f + n_{s,f}^\mu\right) + \left\lfloor \frac{l'}{R} \right\rfloor \quad \text{[Equation 8]}$$

In Equation 8, $N_{slot}^{frame,\mu}$ means the number of slots in one frame for the subcarrier spacing/cyclic prefix determined by μ, $n_f$ may mean the frame number, $n_{s,f}^\mu$ may mean the slot number, l' may mean a specific slot index, and R may mean the repetition factor.

The slot index used in Equation 8 may be replaced with the slot index in the frame. Further, although in the case of Equation 8, the SRS offset is varied in transmission slot units of SRS, this may be replaced with other time units (e.g., symbol units or frame units). As an example, the offset of SRS transmission counting may be set to differ in transmission symbol group units of SRS via a scheme of using Equation 9 below as an offset.

$$\left( \frac{\left(N_{slot}^{frame,\mu} n_f + n_{s,f}^\mu\right) \cdot N_{symb}^{SRS}}{R} \right) \quad \text{[Equation 9]}$$

In Equation 9, $N_{slot}^{frame,\mu}$ means the number of slots in one frame for the subcarrier spacing/cyclic prefix determined by μ, $n_f$ may mean the frame number, $n_{s,f}^\mu$ may mean the slot number, $N_{symb}^{SRS}$ may mean the number of symbols where the SRS is to be transmitted, and R may mean the repetition factor.

Further, the corresponding dependency may be applied using a predefined specific weight or a specific weight set by signaling (e.g., RRC signaling). As an example, the value of slot index*M may be used in the above equation, where M may be a multiplier defined as a natural number. Further, a configured SRS period may be reused.

In this case, a different SRS hopping order may be configured per transmission time. Further, the base station may select a bandwidth where SRS is transmitted so that a plurality of aperiodic SRSs are transmitted at proper timings.

Method 5-2)

Next, a method of explicitly configuring an offset of SRS transmission counting may be considered.

For example, to select a pattern of aperiodic SRS hopping, the base station may configure (or designate) an offset (e.g., $l_{offset}$) of SRS transmission counting for n_SRS in the UE. In this case, a different hopping start timing according to the offset may be set as shown in Equation 10, and different SRS bandwidths depending on hopping start points may be covered.

$$n_{SRS} = \left\lfloor \frac{l'}{R} \right\rfloor + l_{offset} \quad \text{[Equation 10]}$$

At this time, the offset may be selected from among $$\left\{ 0, 1, \ldots, \prod_{b'=b_{hop}}^{b} N_{b'} \right\}.$$

The configuration for the method may be configured (or designated or indicated) in the UE via high layer signaling (e.g., SRS resource configuration in RRC signaling, MAC signaling, i.e., MAC-CE) and/or physical layer signaling (e.g., downlink control information (DCI)). Further, in relation to the configuration for the method, a method of reinterpreting and using the period/offset configuration present in the existing SRS configuration may also be considered.

In particular, where the offset is configured via DCI, the offset of SRS transmission counting may be joint-encoded to the aperiodic SRS configuration of DCI as the higher layer configuration (e.g., RRC configuration). In this case, the overhead of DCI signaling may be reduced using a scheme of selecting the (aperiodic) SRS resource via DCI. Or, information about the increment of the offset may be signaled via, e.g., signaling.

Method 5-3)

Further, a method of determining an offset of SRS transmission counting according to the number of times of SRS transmission may be considered. This is similar to the above-described method 5-2), but the offset of SRS hopping pattern may be determined depending on the number of the aperiodic SRSs transmitted in a (predefined or preset) period (or interval) instead of the slot number.

For example, (when there is no prior transmission of an aperiodic SRS), $l_{offset}=0$ is used for transmission of the first aperiodic SRS and, if an SRS is transmitted again (within a defined or set period) after the aperiodic SRS is transmitted, $l_{offset}=1$ may be used for transmission of the second aperiodic SRS. Similarly, $l_{offset}=n-1$ may be used for transmission of the nth aperiodic SRS.

In this way, the UE may aggregate a plurality of aperiodic SRSs where no period has been configured and cover the full SRS bandwidth.

Upon determining an offset according to the above-described scheme, the number of times of SRS transmission may be multiplied by a specific parameter M and applied. As an example, the number of SRS symbol groups (i.e., N/R) may be used as the specific parameter.

At this time, in the method, period may mean the number of times of SRS transmission. As an example, the SRS period may be the number of times of SRS transmission $$e.g., \left( \left\lceil \frac{\prod_{b'=b_{hop}}^{b} N_{b'}}{N/R} \right\rceil \right)$$

necessary to cover the full, SRS bandwidth. In connection thereto, a method of reinterpreting and using the period/offset configuration present in the existing SRS configuration may also be considered.

In other words, upon aperiodic SRS configuration, when $\pi_{b'=b_{hop}} N_b > N/R$ is established according to C_SRS, B_SRS, and b_hop, n_SRS may be $$n_{SRS} = \left\lfloor \frac{l'}{R} \right\rfloor + (n-l) \cdot M.$$

This may be expressed as in Equation 11 below.

$$n_{SRS} = \begin{cases} \left\lfloor \frac{l'}{R} \right\rfloor + (n-l) \cdot M, & \text{when } \prod_{b'=b_{hop}}^{b} N_{b'} > N/R \\ \left\lfloor \frac{l'}{R} \right\rfloor, & \text{otherwise} \end{cases} \quad \text{[Equation 11]}$$

Or, in the method, period may mean a predetermined time interval. In the time interval, an offset of SRS transmission counting may be determined in the same manner as those described above. The configuration for the same may be configured (or designated or indicated) in the UE via high layer signaling (e.g., SRS resource configuration in RRC signaling, MAC signaling, i.e., MAC-CE) and/or physical layer signaling (e.g., downlink control information (DCI)).

Method 5-4)

Further, a method of determining an offset of SRS transmission counting according to the number of SRS transmission symbol groups may be considered. Although this is similar to the above-described method 5-3), an offset of SRS transmission counting may be determined according to the number of the SRS symbols transmitted (i.e., N/R) instead of the number of the aperiodic SRSs transmitted in a (predefined or configured) period (or interval). In other words, the SRS transmission symbol group in which SRS symbols are repeated may be regarded as one SRS transmission.

For example, (when there is no prior transmission of an aperiodic SRS), $l_{offset}=0$ is used for transmission of the first aperiodic SRS and, if an SRS is transmitted again (within a defined or set period) after the aperiodic SRS is transmitted, $l_{offset}=N1/R1$ (i.e., number of SRS symbols/number of SRS repetitions of the first aperiodic SRS) may be used for transmission of the second aperiodic SRS. Similarly, $$l_{offset} = \sum_{i=0}^{n-1} \frac{N_i}{R_i}$$

may be used for transmission of the nth aperiodic SRS.

At this time, in the method, period may mean the number of times of SRS transmission. As an example, the SRS period may be the number of times of SRS transmission $$e.g., \left( \left\lceil \frac{\prod_{b'=b_{hop}}^{b} N_{b'}}{N/R} \right\rceil \right)$$

necessary to cover the full, SRS bandwidth. In other words, upon aperiodic SRS configuration, when is $\pi_{b'=b_{hop}} N_b > N/R$ is established according to C_SRS, B_SRS, and b_hop, n_SRS may be $$n_{SRS} = \left\lfloor \frac{l'}{R} \right\rfloor + \sum_{i=0}^{n-1} \frac{N_i}{R_i}.$$

This may be expressed as in Equation 12 below.

$$n_{SRS} = \begin{cases} \left\lfloor \frac{l'}{R} \right\rfloor + \sum_{i=0}^{n-1} \frac{N_i}{R_i}, & \text{when } \prod_{b'=b_{hop}}^{b} N_{b'} > N/R \\ \left\lfloor \frac{l'}{R} \right\rfloor, & \text{otherwise} \end{cases} \quad \text{[Equation 12]}$$

In particular, in this case, even for different SRS resources, an offset of SRS transmission counting may be calculated and/or applied in the same manner.

Or, in the method, period may mean a predetermined time period. The configuration for the same may be configured (or designated or indicated) in the UE via high layer signaling (e.g., SRS resource configuration in RRC signaling, MAC signaling, i.e., MAC-CE) and/or physical layer signaling (e.g., downlink control information (DCI)). In connection thereto, a method of reinterpreting and using the period/offset configuration present in the existing SRS configuration may also be considered.

Method 5-5)

Further, a method of configuring a hopping pattern configuration via an offset of SRS transmission counting may also be considered. In other words, the base station may directly configure (or designate or indicate) a hopping sequence (or its equivalent parameter sequence, e.g., the symbol index in the SRS resource) of n_SRS to be used for SRS transmission in the UE.

Figure 9:
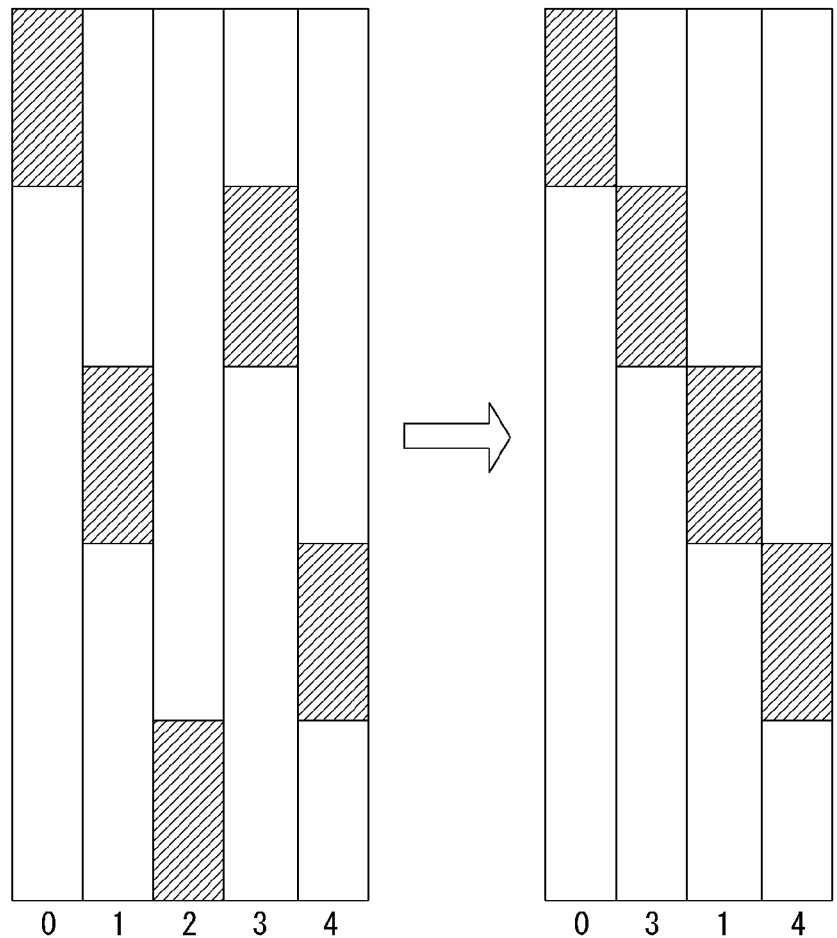
FIG. 9 illustrates an example SRS hopping pattern to which a method as proposed in the disclosure may apply.

FIG. 9 illustrates an example SRS hopping pattern to which a method as proposed in the disclosure may apply. FIG. 9 is intended merely for illustration purposes but not for limiting the scope of the disclosure.

As shown in FIG. 9, the base station may set n_SRS to {0, 3, 1, 4}, and the UE may transmit SRS using the corresponding SRS hop per SRS symbol in order of index. In other words, the base station may explicitly configure an index of SRS transmission symbol and designate an SRS hopping pattern in the UE.

At this time, the base station may configure (or designate or indicate) information about the SRS hopping pattern in the UE via high layer signaling (e.g., SRS resource configuration in RRC signaling, MAC signaling, i.e., MAC-CE) and/or physical layer signaling (e.g., downlink control information (DCI)). In this case, the sequence of n_SRS may be joint-encoded to the aperiodic SRS configuration of DCI as the higher layer configuration (e.g., RRC configuration). In this case, as the sequence of n_SRS is joint-encoded via DCI, the overhead of DCI signaling may be reduced.

Method 6)

Further, the UE may not expect to receive an SRS bandwidth configuration (e.g., C_SRS, B_SRS, b_hop, N_b, N, or R) which may not cover the full SRS bandwidth is configured in the UE.

For convenience in implementing the UE and the simplicity of specifications, the UE may not expect to receive an SRS bandwidth configuration which may not cover the full SRS bandwidth configured in the UE via intra-slot hopping in one slot.

The method may apply likewise to a scheme of dynamically designating, e.g., C_SRS, B_SRS, or b_hop via signaling of DCI.

Although the above-described methods are described based on aperiodic SRS, the methods may also apply likewise to periodic and/or semi-persistent SRS.

For example, the above-described methods may be used when intra-slot hopping and inter-slot hopping both have been enabled but, since transmission period in periodic/semi-persistent SRS is too long, it is preferable to cover the full SRS bandwidth in one slot. In this case, the base station may configure (or designate or indicate) a separate configuration ensuring hopping completeness of one slot in periodic/semi-persistent SRS in the UE via signaling (e.g., RRC signaling or MAC layer signaling), and the UE may apply the above-described methods to the SRS transmission.

Further, as mentioned above, the above-described methods may be applied alone or in combination. In particular, different methods may be applied according to C_SRS (or similarly m_SRS,0) values or ranges.

Further, although the above methods have been described based on NR system (i.e., 3GPP new RAT system) for ease of description, the scope of systems to which the proposed schemes are applied may be expanded to other systems (e.g., LTE system or UTRA system), in particular 5G and its candidate technologies, than the NR system.

Figure 10:
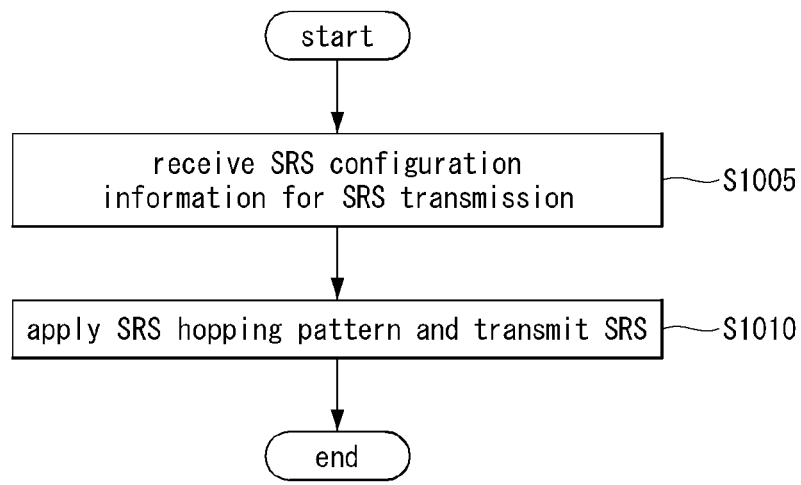
FIG. 10 is a flowchart illustrating operations of a UE transmitting an SRS, to which a method as proposed in the disclosure may apply.

FIG. 10 is a flowchart illustrating operations of a UE transmitting a sounding reference signal (SRS), to which a method as proposed in the disclosure may apply. FIG. 10 is intended merely for illustration purposes but not for limiting the scope of the disclosure.

Referring to FIG. 10, it is assumed that the UE and the base station perform SRS transmission/reception based on the above-described methods (in particular, method 2) in the disclosure.

First, the UE may receive SRS configuration information for transmission of an SRS from the base station (S1005). Here, the SRS configuration information may include SRS bandwidth configuration information (e.g., C_SRS) related to an SRS hopping pattern. Further, as in the above-described methods, a first parameter (e.g., m_SRS,0) indicating a full bandwidth allocated to the SRS, a second parameter (e.g., m_SRS,1, m_SRS,2, or m_SRS,3) indicating a bandwidth for a hopping unit of the SRS, and a third parameter (e.g., N_0, N_1, N_2, or N_3) indicating the number of hopping units of the SRS may be determined based on the SRS bandwidth configuration information.

Thereafter, the UE may apply the SRS hopping pattern configured based on the first parameter, the second parameter, and the third parameter and transmit the SRS to the base station (S1010).

At this time, as described above, a value of the third parameter may be configured in association with the number of symbols constituting the SRS hopping pattern. As an example, the number of the symbols constituting the SRS hopping pattern may be determined by the number of symbols of an SRS resource allocated for the transmission of the SRS and a repetition factor related to the transmission of the SRS.

Further, as in the above-described methods, the UE may receive information about multiple third parameter sets for configuring the third parameter from the base station and receive information indicating a specific third parameter set among the multiple third parameter sets from the base station via signaling. In this case, the third parameter may be included in the specific third parameter set.

Further, as in the above-described methods, the product of a comb value for the SRS and a length of a sequence generating the SRS may be set to a multiple of the number of resource elements constituting a resource block.

Further, in a case where an nth SRS bandwidth configuration is indicated by the SRS bandwidth configuration information, and the SRS hopping pattern is not located in one slot allocated for the transmission of the SRS, the UE may be configured to transmit the SRS based on an n−1th SRS bandwidth configuration.

Further, a slot offset related to a counting of the SRS transmission may be determined according to a transmission timing of the SRS. Or, the slot offset related to the counting of the SRS transmission may be determined according to the number of times of transmission of the SRS and, in this case, the number of times of transmission of the SRS may be the number of aperiodic SRSs transmitted in a predefined specific period.

Figure 11:
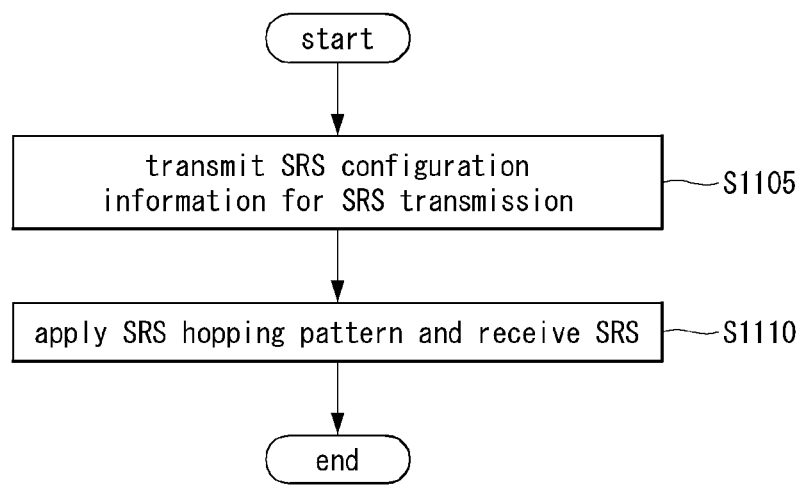
FIG. 11 is a flowchart illustrating operations of a base station receiving an SRS, to which a method as proposed in the disclosure may apply.

FIG. 11 is a flowchart illustrating operations of a base station receiving a sounding reference signal (SRS), to which a method as proposed in the disclosure may apply. FIG. 11 is intended merely for illustration purposes but not for limiting the scope of the disclosure.

Referring to FIG. 11, it is assumed that the UE and the base station perform SRS transmission/reception based on the above-described methods (in particular, method 2) in the disclosure.

First, the base station may transmit SRS configuration information for transmission of an SRS to the UE (S1105). Here, the SRS configuration information may include SRS bandwidth configuration information (e.g., C_SRS) related to an SRS hopping pattern. Further, as in the above-described methods, a first parameter (e.g., m_SRS,0) indicating a full bandwidth allocated to the SRS, a second parameter (e.g., m_SRS,1, m_SRS,2, or m_SRS,3) indicating a bandwidth for a hopping unit of the SRS, and a third parameter (e.g., N_0, N_1, N_2, or N_3) indicating the number of hopping units of the SRS may be determined based on the SRS bandwidth configuration information.

Thereafter, the base station may receive, from the UE, the SRS to which the SRS hopping pattern configured based on the first parameter, the second parameter, and the third parameter has been applied (S1110).

At this time, as described above, a value of the third parameter may be configured in association with the number of symbols constituting the SRS hopping pattern. As an example, the number of the symbols constituting the SRS hopping pattern may be determined by the number of symbols of an SRS resource allocated for the transmission of the SRS and a repetition factor related to the transmission of the SRS.

Further, as in the above-described methods, the base station may transmit information about multiple third parameter sets for configuring the third parameter to the UE and transmit information indicating a specific third parameter set among the multiple third parameter sets to the UE via signaling. In this case, the third parameter may be included in the specific third parameter set.

Further, as in the above-described methods, the product of a comb value for the SRS and a length of a sequence generating the SRS may be set to a multiple of the number of resource elements constituting a resource block.

Further, in a case where an nth SRS bandwidth configuration is indicated by the SRS bandwidth configuration information, and the SRS hopping pattern is not located in one slot allocated for the transmission of the SRS, the UE may be configured to transmit the SRS based on an n−1th SRS bandwidth configuration.

Further, a slot offset related to a counting of the SRS transmission may be determined according to a transmission timing of the SRS. Or, the slot offset related to the counting of the SRS transmission may be determined according to the number of times of transmission of the SRS and, in this case, the number of times of transmission of the SRS may be the number of aperiodic SRSs transmitted in a predefined specific period.

As described above, when the UE and/or base station transmits or receives an SRS via the methods described in the disclosure, although a hopping pattern is applied to the SRS, the SRS hopping may be completely performed within one slot and the whole SRS bandwidth. Thus, an SRS transmission resource may be efficiently configured, and overhead and complexity related to SRS transmission/reception by the UE and/or base station may be reduced.

Devices to Which the Disclosure May Apply

Figure 12:
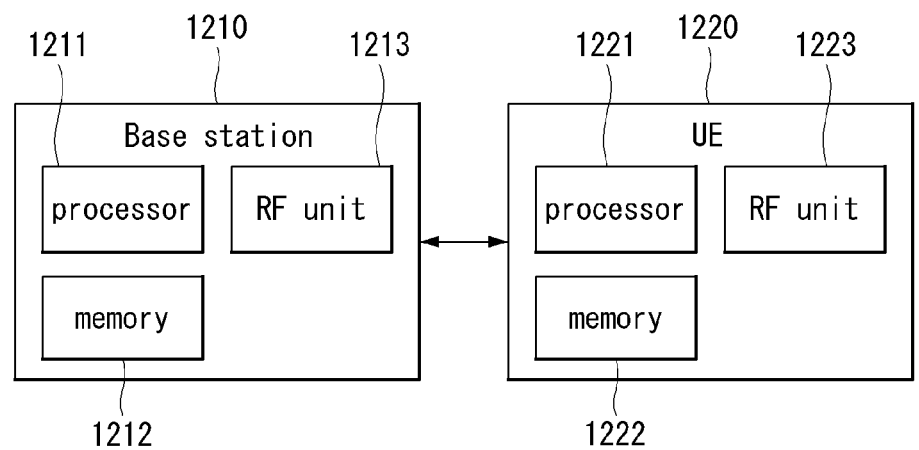
FIG. 12 is a block diagram illustrating a configuration of a wireless communication device to which methods proposed according to the disclosure are applicable.

FIG. 12 is a block diagram illustrating a configuration of a wireless communication device to which methods proposed according to the disclosure are applicable.

Referring to FIG. 12, a wireless communication system includes a base station 1210 and a plurality of UEs 1220 positioned in the coverage of the base station 1210.

The base station 1210 includes a processor 1211, a memory 1212, and a radio frequency (RF) unit 1213. The processor 1211 implements the functions, processes or steps, and/or methods proposed above in connection with FIGS. 1 to 11. Wireless interface protocol layers may be implemented by the processor 1211. The memory 1212 is connected with the processor 1211 to store various pieces of information for driving the processor 1211. The RF unit 1213 is connected with the processor 1211 to transmit and/or receive wireless signals.

For example, the processor 1211 may transmit SRS configuration information for transmission of an SRS to the UE using the RF unit 1213 (S1105). Here, the SRS configuration information may include SRS bandwidth configuration information (e.g., C_SRS) related to an SRS hopping pattern. Further, as in the above-described methods, a first parameter (e.g., m_SRS,0) indicating a full bandwidth allocated to the SRS, a second parameter (e.g., m_SRS,1, m_SRS,2, or m_SRS,3) indicating a bandwidth for a hopping unit of the SRS, and a third parameter (e.g., N_0, N_1, N_2, or N_3) indicating the number of hopping units of the SRS may be determined based on the SRS bandwidth configuration information.

Thereafter, the processor 1211 may receive, from the UE, the SRS to which the SRS hopping pattern configured based on the first parameter, the second parameter, and the third parameter has been applied, using the RF unit 1213 (S1110).

At this time, as described above, a value of the third parameter may be configured in association with the number of symbols constituting the SRS hopping pattern. As an example, the number of the symbols constituting the SRS hopping pattern may be determined by the number of symbols of an SRS resource allocated for the transmission of the SRS and a repetition factor related to the transmission of the SRS.

Further, as in the above-described methods, the base station may transmit information about multiple third parameter sets for configuring the third parameter to the UE and transmit information indicating a specific third parameter set among the multiple third parameter sets to the UE via signaling. In this case, the third parameter may be included in the specific third parameter set.

Further, as in the above-described methods, the product of a comb value for the SRS and a length of a sequence generating the SRS may be set to a multiple of the number of resource elements constituting a resource block.

Further, in a case where an nth SRS bandwidth configuration is indicated by the SRS bandwidth configuration information, and the SRS hopping pattern is not located in one slot allocated for the transmission of the SRS, the UE may be configured to transmit the SRS based on an n−1th SRS bandwidth configuration.

Further, a slot offset related to a counting of the SRS transmission may be determined according to a transmission timing of the SRS. Or, the slot offset related to the counting of the SRS transmission may be determined according to the number of times of transmission of the SRS and, in this case, the number of times of transmission of the SRS may be the number of aperiodic SRSs transmitted in a predefined specific period.

The UE 1220 includes a processor 1221, a memory 1222, and an RF unit 1223.

The processor 1221 implements the functions, processes or steps, and/or methods proposed above in connection with FIGS. 1 to 11. Wireless interface protocol layers may be implemented by the processor 1221. The memory 1222 is connected with the processor 1221 to store various pieces of information for driving the processor 1221. The RF unit 1223 is connected with the processor 1221 to transmit and/or receive wireless signals.

The memory 1212 and 1222 may be positioned inside or outside the processor 1211 and 1221 and be connected with the processor 1211 and 1221 via various known means.

For example, the processor 1221 may receive SRS configuration information for transmission of an SRS from the base station using the RF unit 1223 (S1005). Here, the SRS configuration information may include SRS bandwidth configuration information (e.g., C_SRS) related to an SRS hopping pattern. Further, as in the above-described methods, a first parameter (e.g., m_SRS,0) indicating a full bandwidth allocated to the SRS, a second parameter (e.g., m_SRS,1, m_SRS,2, or m_SRS,3) indicating a bandwidth for a hopping unit of the SRS, and a third parameter (e.g., N_0, N_1, N_2, or N_3) indicating the number of hopping units of the SRS may be determined based on the SRS bandwidth configuration information.

Thereafter, the processor 1221 may transmit, to the base station, the SRS to which the SRS hopping pattern configured based on the first parameter, the second parameter, and the third parameter has been applied, using the RF unit 1223 (S1010).

At this time, as described above, a value of the third parameter may be configured in association with the number of symbols constituting the SRS hopping pattern. As an example, the number of the symbols constituting the SRS hopping pattern may be determined by the number of symbols of an SRS resource allocated for the transmission of the SRS and a repetition factor related to the transmission of the SRS.

Further, as in the above-described methods, the UE may receive information about multiple third parameter sets for configuring the third parameter from the base station and receive information indicating a specific third parameter set among the multiple third parameter sets from the base station via signaling. In this case, the third parameter may be included in the specific third parameter set.

Further, as in the above-described methods, the product of a comb value for the SRS and a length of a sequence generating the SRS may be set to a multiple of the number of resource elements constituting a resource block.

Further, in a case where an nth SRS bandwidth configuration is indicated by the SRS bandwidth configuration information, and the SRS hopping pattern is not located in one slot allocated for the transmission of the SRS, the UE may be configured to transmit the SRS based on an n−1th SRS bandwidth configuration.

Further, a slot offset related to a counting of the SRS transmission may be determined according to a transmission timing of the SRS. Or, the slot offset related to the counting of the SRS transmission may be determined according to the number of times of transmission of the SRS and, in this case, the number of times of transmission of the SRS may be the number of aperiodic SRSs transmitted in a predefined specific period.

As an example, to transmit/receive downlink (DL) data in a wireless communication system supporting low-latency service, the UE may include a radio frequency (RF) unit for transmitting/receiving radio signals and a processor functionally connected with the RF unit.

The base station 1210 and/or the UE 1220 may include a single or multiple antennas.

Figure 13:
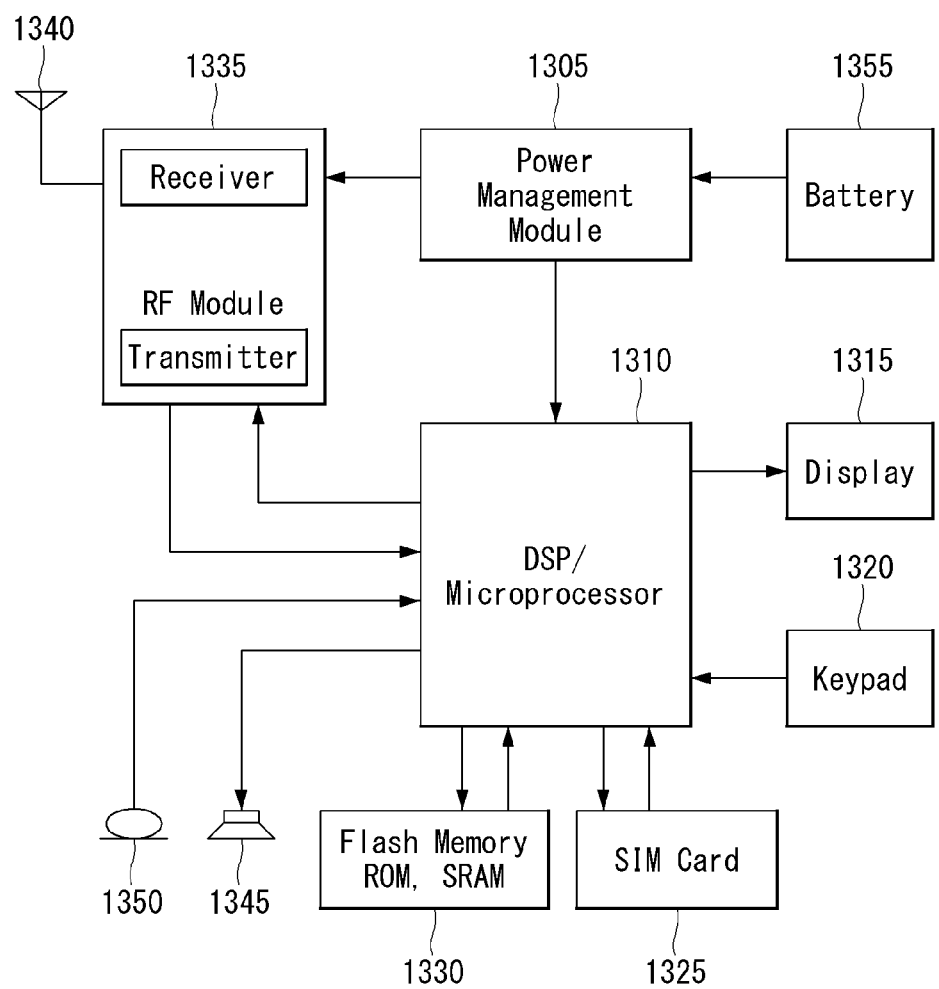
FIG. 13 is a block diagram illustrating a configuration of a communication device according to an embodiment of the disclosure.

FIG. 13 is a block diagram illustrating a configuration of a communication device according to an embodiment of the disclosure.

In particular, FIG. 13 illustrates in greater detail the UE of FIG. 12.

Referring to FIG. 13, the UE may include a processor (or a digital signal processor (DSP)) 1310, an RF module (or RF unit) 1335, a power management module 1305, an antenna 1340, a battery 1355, a display 1315, a keypad 1320, a memory 1330, a subscriber identification module (SIM) card 1325 (which is optional), a speaker 1345, and a microphone 1350. The UE may include a single or multiple antennas.

The processor 1310 implements the functions, processes or steps, and/or methods proposed above in connection with FIGS. 1 to 11. Wireless interface protocol layers may be implemented by the processor 1310.

The memory 1330 is connected with the processor 1310 to store information related to the operation of the processor 1310. The memory 1330 may be positioned inside or outside the processor 1310 and be connected with the processor 1310 via various known means.

For example, the user inputs instruction information, e.g., a phone number, by voice activation using the microphone 1350 or by pressing (or touching) a button of the keypad 1320. The processor 1310 receives the instruction information and handles performing a proper function, e.g., calling at the phone number. Operational data may be extracted from the SIM card 1325 or the memory 1330. Further, the processor 1310 may display the instruction information or operational information on the display 1315 for convenience or user's recognition.

The RF module 1335 is connected with the processor 1310 to transmit and/or receive RF signals. The processor 1310 transfers instruction information to the RF module 1335 to initiate communication, e.g., to transmit a wireless signal constituting voice communication data.

The RF module 1335 includes a receiver and a transmitter for receiving and transmitting wireless signals. The antenna 1340 functions to transmit and receive wireless signals. Upon receiving a wireless signal, the RF module 1335 transfers the signal for processing by the processor 1310 and convert the signal into a base-band signal. The processed signal may be converted into readable or audible information output via the speaker 1345.

Figure 14:
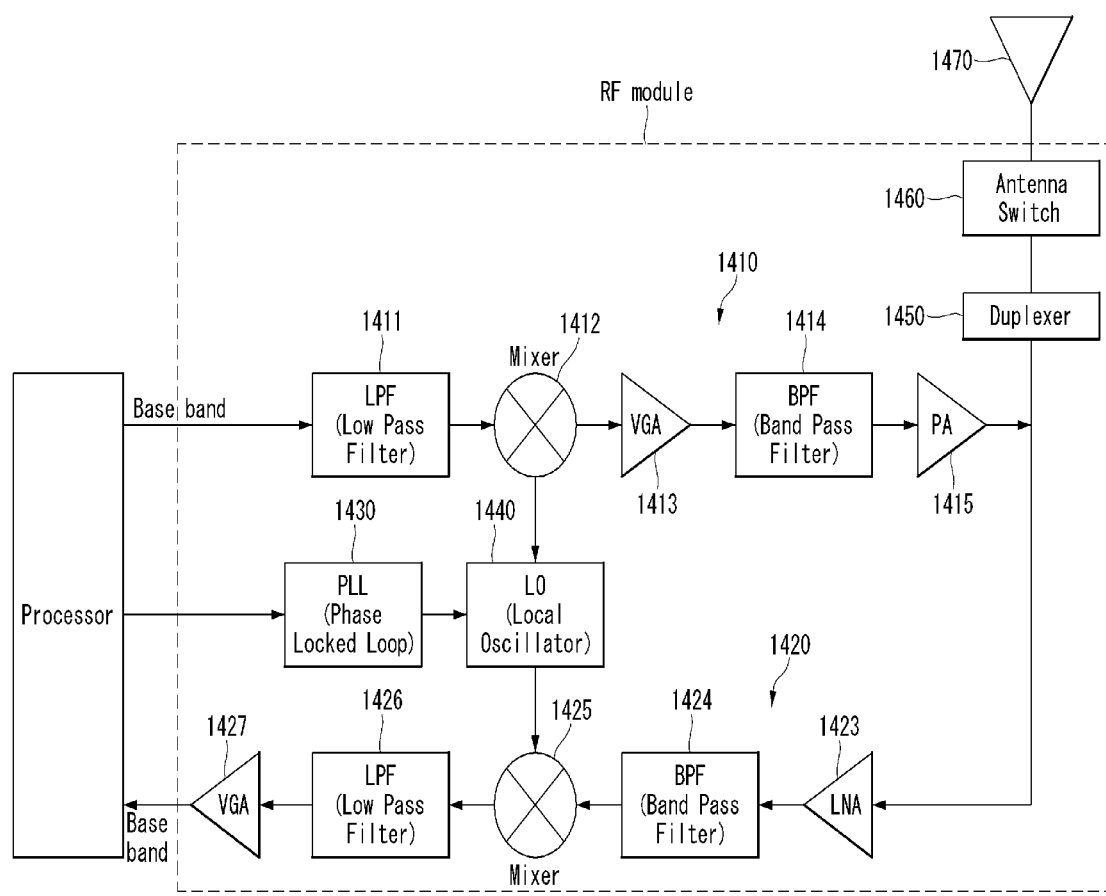
FIG. 14 is a view illustrating an example RF module of a wireless communication device to which a method proposed herein is applicable.

FIG. 14 is a view illustrating an example RF module of a wireless communication device to which a method proposed herein is applicable.

Specifically, FIG. 14 illustrates an example RF module that may be implemented in a frequency division duplex (FDD) system.

First, in a transmission path, the processor described above in connection with FIGS. 12 and 13 processes data to be transmitted and provides an analog output signal to a transmitter 1410.

In the transmitter 1410, the analog output signal is filtered by a low pass filter (LPF) 1411 for removing images caused by digital-to-analog conversion (ADC), up-converted from baseband to RF by an up-converter (e.g., Mixer) 1412, and amplified by a variable gain amplifier (VGA) 1413. The amplified signal is filtered by a filter 1414, further amplified by a power amplifier (PA) 1415, routed via duplexer(s) 1450/antenna switch(es) 1460, and transmitted via an antenna 1470.

In a reception path, the antenna receives signals from the outside and provides the received signals. The signals are routed via the antenna switch(es) 1460/duplexers 1450 and are provided to a receiver 1420.

In the receiver 1420, the received signals are amplified by a low noise amplifier (LNA) 1423, filtered by a band pass filter 1424, and down-converted from RF to baseband by a down-converter (e.g., a mixer) 1425.

The down-converted signals are filtered by a low pass filter (LPF) 1426 and amplified by a VGA 1427 so that an analog input signal is obtained. The obtained analog input signal is provided to the processor described above in connection with FIGS. 12 and 13.

A local oscillator (LO) generator 1440 generates transmission and reception LO signals and provides them to the up-converter 1412 and the down-converter 1425, respectively.

A phase locked loop (PLL) 1430 receives control signals from the processor to generate transmission and reception LO signals at proper frequencies and provide the control signals to the LO generator 1440.

The circuits shown in FIG. 14 may have a different arrangement than that shown in FIG. 14.

Figure 15:
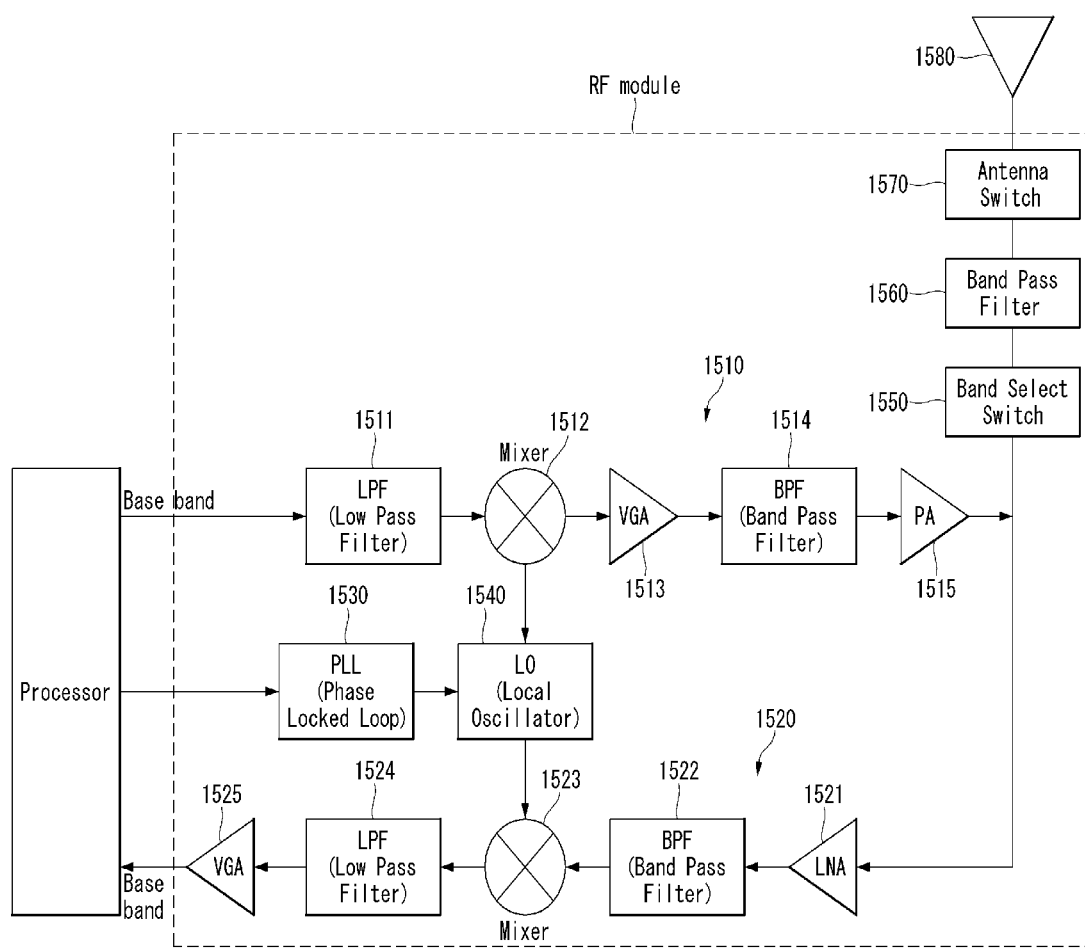
FIG. 15 is a view illustrating another example RF module of a wireless communication device to which a method proposed herein is applicable.

FIG. 15 is a view illustrating another example RF module of a wireless communication device to which a method proposed herein is applicable.

Specifically, FIG. 15 illustrates an example RF module that may be implemented in a time division duplex (TDD) system.

In the TDD system, the transceiver 1510 and receiver 1520 of the RF module are identical in structure to the transceiver and receiver of the RF module in the FDD system.

The following description of the RF module of the TDD system focuses primarily on differences from the RF module of the FDD system, and the description in connection with FIG. 14 may apply to the same structure.

The signal amplified by the power amplifier (PA) 1515 of the transmitter is routed via the band select switch 1550, the band pass filter (BPF) 1560, and antenna switch(es) 1570 and is transmitted via the antenna 1580.

In a reception path, the antenna receives signals from the outside and provides the received signals. The signals are routed via the antenna switch(es) 1570, band pass filter 1560, and band select switch 1550 and are provided to the receiver 1520.

The above-described embodiments regard predetermined combinations of the components and features of the disclosure. Each component or feature should be considered as optional unless explicitly mentioned otherwise. Each component or feature may be practiced in such a manner as not to be combined with other components or features. Further, some components and/or features may be combined together to configure an embodiment of the disclosure. The order of the operations described in connection with the embodiments of the disclosure may be varied. Some components or features in an embodiment may be included in another embodiment or may be replaced with corresponding components or features of the other embodiment. It is obvious that the claims may be combined to constitute an embodiment unless explicitly stated otherwise or such combinations may be added in new claims by an amendment after filing.

The embodiments of the disclosure may be implemented by various means, e.g., hardware, firmware, software, or a combination thereof. When implemented in hardware, an embodiment of the disclosure may be implemented with, e.g., one or more application specific integrated circuits (ASICs), digital signal processors (DSPs), digital signal processing devices (DSPDs), programmable logic devices (PLDs), field programmable gate arrays (FPGAs), processors, controllers, micro-controllers, or micro-processors.

When implemented in firmware or hardware, an embodiment of the disclosure may be implemented as a module, procedure, or function performing the above-described functions or operations. The software code may be stored in a memory and driven by a processor. The memory may be positioned inside or outside the processor to exchange data with the processor by various known means.

It is apparent to one of ordinary skill in the art that the disclosure may be embodied in other specific forms without departing from the essential features of the disclosure. Thus, the above description should be interpreted not as limiting in all aspects but as exemplary. The scope of the disclosure should be determined by reasonable interpretations of the appended claims and all equivalents of the disclosure belong to the scope of the disclosure.

INDUSTRIAL AVAILABILITY

Although the scheme of transmitting/receiving sounding reference signals in the wireless communication system according to the disclosure has been described in connection with examples in which it applies to 3GPP LTE/LTE-A system, 5G systems (new RAT systems), the scheme is also applicable to other various wireless communication systems.

The invention claimed is:

1. A method of transmitting a sounding reference signal (SRS) by a user equipment (UE) in a wireless communication system, the method comprising:
receiving, from a base station, SRS configuration information for transmission of the SRS,
wherein the SRS configuration information includes SRS bandwidth configuration information related to an SRS hopping pattern,
wherein a first parameter indicating a full bandwidth allocated to the SRS, a second parameter indicating a bandwidth for hopping units of the SRS, and a third parameter indicating a number of the hopping units of the SRS are determined based on the SRS bandwidth configuration information; and
transmitting the SRS, to the base station, by applying the SRS hopping pattern configured based on the first parameter, the second parameter, and the third parameter,
wherein a value of the third parameter is configured in association with a number of symbols constituting the SRS hopping pattern.

2. The method of claim 1, wherein the number of the symbols constituting the SRS hopping pattern is determined by a number of symbols for an SRS resource allocated for the transmission of the SRS and a repetition factor related to the transmission of the SRS.

3. The method of claim 2, further comprising:
receiving, from the base station, information for a plurality of third parameter sets for configuring the third parameter; and
receiving, from the base station, information indicating a specific third parameter set among the plurality of third parameter sets,
wherein the third parameter is included in the specific third parameter set.

4. The method of claim 2, wherein a product of a comb value for the SRS and a length of a sequence generating the SRS is set to a multiple of a number of resource elements constituting a resource block.

5. The method of claim 1, wherein in a case where an nth SRS bandwidth configuration is indicated by the SRS bandwidth configuration information, and the SRS hopping pattern is not located in one slot allocated for the transmission of the SRS:
the UE is configured to transmit the SRS based on an (n−1)st SRS bandwidth configuration.

6. The method of claim 1, wherein a slot offset related to a counting of SRS transmissions is determined according to a transmission timing of the SRS.

7. The method of claim 1, wherein
a slot offset related to a counting of SRS transmissions is determined according to a number of times of the transmission of the SRS.

8. The method of claim 7, wherein a number of times of the transmission of the SRS is a number of aperiodic SRSs transmitted in a predefined specific period.

9. A user equipment (UE) configured to transmit a sounding reference signal (SRS) in a wireless communication system, the UE comprising:
a radio frequency (RF) unit for transmitting and receiving a radio signal; and a processor functionally connected with the RF unit, wherein the processor is configured to control the UE to:

receive, from a base station, SRS configuration information for transmission of the SRS, wherein the SRS configuration information includes SRS bandwidth configuration information related to an SRS hopping pattern, wherein a first parameter indicating a full bandwidth allocated to the SRS, a second parameter indicating a bandwidth for hopping units of the SRS, and a third parameter indicating a number of the hopping units of the SRS are determined based on the SRS bandwidth configuration information; and transmit the SRS, to the base station, by applying the SRS hopping pattern configured based on the first parameter, the second parameter, and the third parameter, wherein a value of the third parameter is configured in association with a number of symbols constituting the SRS hopping pattern.

10. The UE of claim 9, wherein the number of the symbols constituting the SRS hopping pattern is determined by a number of symbols for an SRS resource allocated for the transmission of the SRS and a repetition factor related to the transmission of the SRS.

11. The UE of claim 10, wherein the processor is further configured to control the UE to:

receive, from the base station, information for a plurality of third parameter sets for configuring the third parameter; and receive, from the base station, information indicating a specific third parameter set among the plurality of third parameter sets, wherein the third parameter is included in the specific third parameter set.

12. The UE of claim 10, wherein a product of a comb value for the SRS and a length of a sequence generating the SRS is set to a multiple of a number of resource elements constituting a resource block.

13. The UE of claim 9, wherein in a case where an nth SRS bandwidth configuration is indicated by the SRS bandwidth configuration information, and the SRS hopping pattern is not located in one slot allocated for the transmission of the SRS:

the UE is configured to transmit the SRS based on an (n−1)st SRS bandwidth configuration.

14. A base station configured to receive a sounding reference signal (SRS) in a wireless communication system, the base station comprising:

a radio frequency (RF) unit for transmitting and receiving a radio signal; and a processor functionally connected with the RF unit, wherein the processor is configured to control the base station to:

transmit, to a user equipment (UE), SRS configuration information for transmission of the SRS, wherein the SRS configuration information includes SRS bandwidth configuration information related to an SRS hopping pattern, wherein a first parameter indicating a full bandwidth allocated to the SRS, a second parameter indicating a bandwidth for hopping units of the SRS, and a third parameter indicating a number of the hopping units of the SRS are determined based on the SRS bandwidth configuration information; and receive, from the UE, the SRS to which the SRS hopping pattern configured based on the first parameter, the second parameter, and the third parameter is applied, wherein a value of the third parameter is configured in association with a number of symbols constituting the SRS hopping pattern.

15. The base station of claim 14, wherein the number of the symbols constituting the SRS hopping pattern is determined by a number of symbols for an SRS resource allocated for the transmission of the SRS and a repetition factor related to the transmission of the SRS.

* * * * *